United States Patent
Hwang et al.

(10) Patent No.: US 12,120,639 B2
(45) Date of Patent: *Oct. 15, 2024

(54) PERFORMING DISCONTINUOUS RECEPTION (DRX) OPERATION BASED ON DOWNLINK CONTROL INFORMATION (DCI)

(71) Applicant: LG Electronics Inc., Seoul (KR)

(72) Inventors: Seunggye Hwang, Seoul (KR); Changhwan Park, Seoul (KR); Joonkui Ahn, Seoul (KR); Hanjun Park, Seoul (KR); Suckchel Yang, Seoul (KR); Sukhyon Yoon, Seoul (KR); Seokmin Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,489

(22) Filed: Oct. 6, 2023

(65) Prior Publication Data

US 2024/0049179 A1    Feb. 8, 2024

Related U.S. Application Data

(63) Continuation of application No. 17/129,301, filed on Dec. 21, 2020, now Pat. No. 11,818,685, which is a continuation of application No. 16/379,288, filed on Apr. 9, 2019, now Pat. No. 10,904,861, which is a continuation of application No. PCT/KR2018/003435, filed on Mar. 23, 2018.

(60) Provisional application No. 62/586,210, filed on Nov. 15, 2017, provisional application No. 62/568,813, filed on Oct. 6, 2017, provisional application No.
(Continued)

(30) Foreign Application Priority Data

Mar. 22, 2018    (KR) ........................ 10-2018-0033509

(51) Int. Cl.
*H04W 68/02*    (2009.01)
*H04W 52/02*    (2009.01)
*H04W 84/12*    (2009.01)

(52) U.S. Cl.
CPC ....... *H04W 68/02* (2013.01); *H04W 52/0216* (2013.01); *H04W 52/0229* (2013.01); *H04W 84/12* (2013.01); *Y02D 30/70* (2020.08)

(58) Field of Classification Search
CPC ............. H04W 68/02; H04W 52/0216; H04W 52/0229; H04W 52/48; H04W 84/12; Y02D 70/00
See application file for complete search history.

(56) References Cited

U.S. PATENT DOCUMENTS

2017/0078963 A1*    3/2017  Qi ........................... H04W 4/70
2017/0325167 A1*   11/2017  Lu ..................... H04W 52/0235
(Continued)

*Primary Examiner* — Ian N Moore
*Assistant Examiner* — Brian T Le
(74) *Attorney, Agent, or Firm* — Fish & Richardson P.C.

(57) ABSTRACT

One disclosure in the present specification presents a method for a wireless device to receive a paging message. The method may comprise: a step of deciding a wake up signal occasion (WUSO) window for attempting to receive a wake up signal (WUS); and a step of monitoring a downlink control channel during a paging window so as to attempt to receive a paging message, if the WUS is received within the decided WUSO window. Here, the WUSO window may be decided according to a duration size and offset.

20 Claims, 25 Drawing Sheets

Related U.S. Application Data

62/565,080, filed on Sep. 28, 2017, provisional application No. 62/565,082, filed on Sep. 28, 2017, provisional application No. 62/520,557, filed on Jun. 16, 2017, provisional application No. 62/520,555, filed on Jun. 16, 2017, provisional application No. 62/491,303, filed on Apr. 28, 2017, provisional application No. 62/491,300, filed on Apr. 28, 2017, provisional application No. 62/475,879, filed on Mar. 24, 2017.

(56) References Cited

U.S. PATENT DOCUMENTS

2018/0115953 A1* 4/2018 Shellhammer .... H04W 52/0216
2018/0184379 A1* 6/2018 Liu ................... H04W 52/0219

* cited by examiner

PERFORMING DISCONTINUOUS RECEPTION (DRX) OPERATION BASED ON DOWNLINK CONTROL INFORMATION (DCI)

CROSS-REFERENCE TO RELATED APPLICATIONS

This application is a continuation of U.S. application Ser. No. 17/129,301, filed on Dec. 21, 2020, which is a continuation of U.S. application Ser. No. 16/379,288, filed on Apr. 9, 2019, now U.S. Pat. No. 10,904,861, which is a continuation pursuant to 35 U.S.C. § 119(e) of International Application No. PCT/KR2018/003435, filed on Mar. 23, 2018, which claims the benefit of U.S. Provisional Applications No. 62/475,879, filed on Mar. 24, 2017, No. 62/491,300, filed on Apr. 28, 2017, No. 62/491,303, filed on Apr. 28, 2017, No. 62/520,555, filed on Jun. 16, 2017, No. 62/520,557, filed on Jun. 16, 2017, No. 62/565,080, filed on Sep. 28, 2017, No. 62/565,082, filed on Sep. 28, 2017, No. 62/568,813, filed on Oct. 6, 2017, No. 62/586,210, filed on Nov. 15, 2017, and Korean Application No. 10-2018-0033509, filed on Mar. 22, 2018. The disclosures of the prior applications are incorporated by reference in their entirety.

BACKGROUND OF THE INVENTION

Field of the Invention

The present invention relates to mobile communication.

Related Art

When a base station (BS) has downlink data to transmit to a terminal in a radio resource control (RRC)-idle state, the base station transmits a paging message in order to switch the terminal to an RRC-connected mode.

To receive the paging message, the terminal needs to monitor a downlink control channel, for example, a physical downlink control channel (PDCCH). However, when the monitoring period is short, a period for the terminal to perform blind decoding (BD) is short, causing an increase in power consumption.

Recently, it has been considered to extend or enhance cell coverage for Internet of Things (IoT) communication, and various techniques have been under discussion to extend or enhance cell coverage. To extend or enhance cell coverage, a downlink channel or an uplink channel can be repeatedly transmitted on a plurality of subframes.

However, such repeated transmissions may increase the power consumption of the terminal.

SUMMARY OF THE INVENTION

Accordingly, a disclosure of the present specification has been made in an effort to solve the aforementioned problem.

To achieve the foregoing purposes, the disclosure of the present invention proposes a method of receiving, by a wireless device, a paging message, the method comprising: determining a wake-up signal occasion (WUSO) window in which an attempt to receive a wake-up signal (WUS) is made; and monitoring a downlink control channel during a paging window in order to attempt to receive a paging message when the WUS is received within the determined WUSO window. The WUSO window is determined by an interval size and an offset.

The WUS may indicate a plurality of paging windows or a paging occasion (PO), and the PO indicates a subframe in which transmission of the paging message starts within the paging window.

A time interval in which the WUS is present within the determined WUSO window may be defined as a WUSO.

The offset may indicate a difference between the PO and a start point or an end point of the WUSO window.

When a subframe in which the WUSO is present is an invalid subframe, the WUSO may be postponed to a following valid subframe.

A frequency resource region in which the WUSO window is present may be the same as a frequency resource region in which a PO is positioned.

When the WUSO entirely or partially overlaps a search space for another downlink control channel on a time resource or when the WUSO entirely or partially overlaps another channel on a time resource, the attempt to receive the WUS may be dropped.

When the attempt to receive the WUS is dropped, reception of the paging message may be monitored during a PO corresponding to the WUSO regardless of whether the WUS is transmitted in the WUSO.

The WUS comprises an identifier of a wireless device that receives the paging message or a group identifier of wireless devices that receive the paging message.

A block used by the WUS is defined as a wake-up signal block (WUSB), and a repetition size of the WUSB is determined based on a higher-layer parameter configured for the WUS and a higher-layer parameter configured for the paging message.

The WUS is generated based on any one of a plurality of sequences, and the sequence is generated using an identifier of a wireless device or a group identifier of wireless devices.

At least one of the plurality of sequences is used to wake up all wireless devices or to make all wireless devices to sleep.

To achieve the foregoing purposes, the disclosure of the present invention proposes a wireless device that receives a paging message. The wireless device may comprise: a transceiver; and a processor configured to control the transceiver. wherein the processor is configured to: determine a wake-up signal occasion (WUSO) window in which an attempt to receive a wake-up signal (WUS) is made; and monitor a downlink control channel during a paging window by controlling the transceiver in order to attempt to receive a paging message when the WUS is received within the determined WUSO window. The WUSO window is determined by an interval size and an offset.

According to the disclosure of the present invention, the problem of the conventional technology described above may be solved.

DESCRIPTION OF EXEMPLARY EMBODIMENTS

Figure 1:
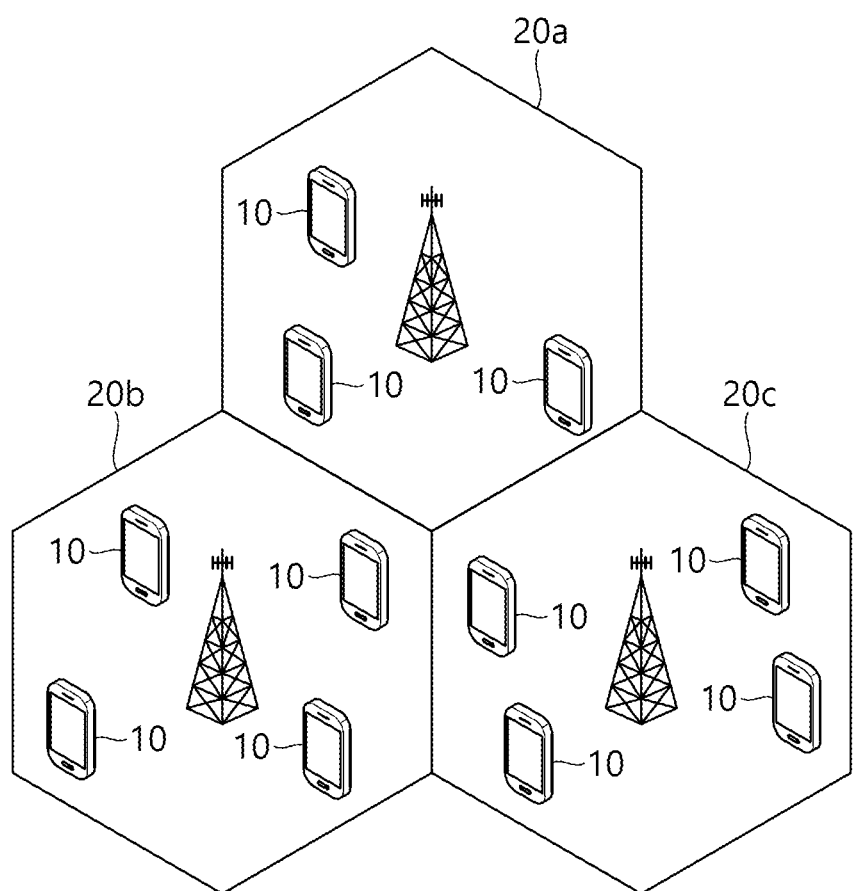
FIG. 1 is a wireless communication system.

[44] Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'NB IoT user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The NB IoT UE generally belongs to one cell and the cell to which the NB IoT UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the NB IoT UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
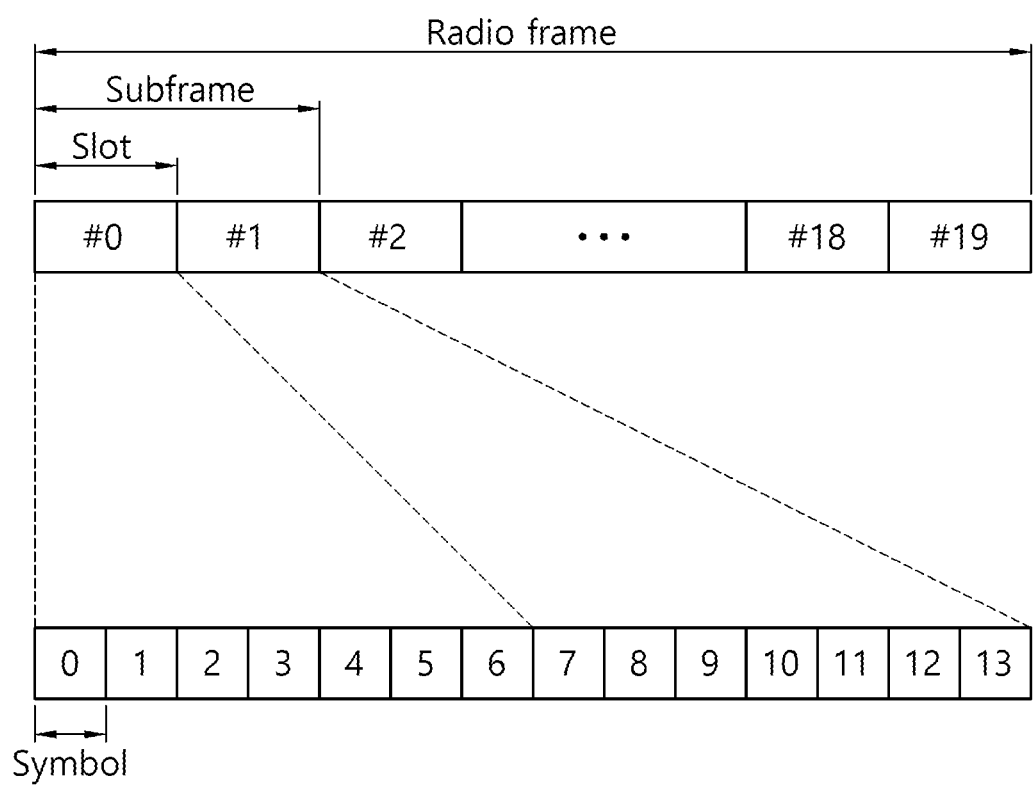
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

One slot includes NR resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
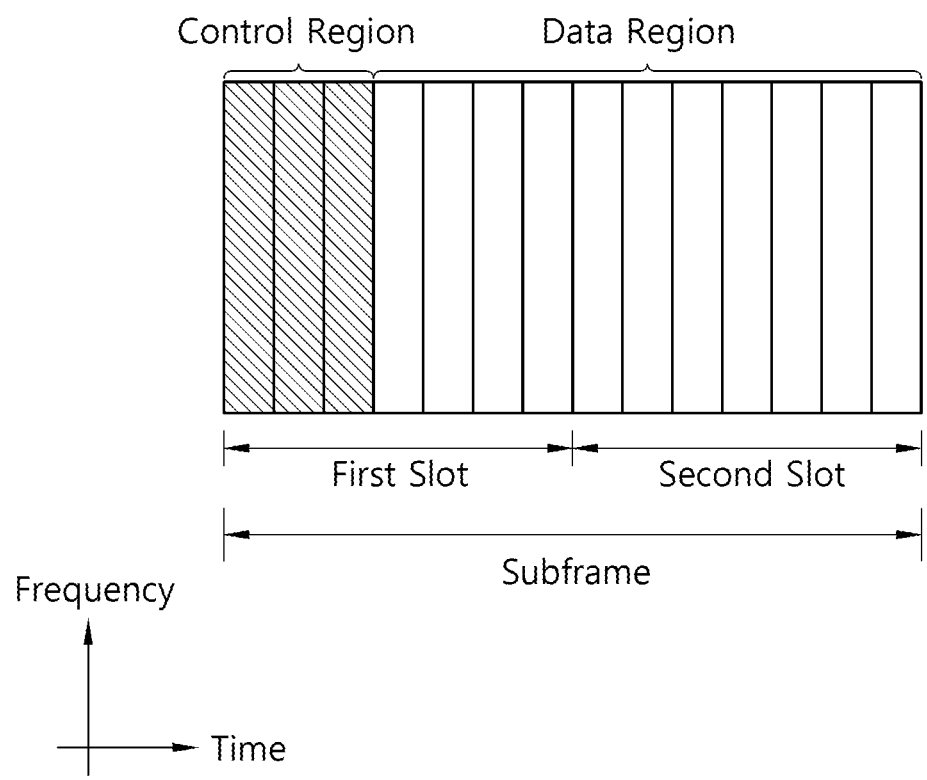
FIG. 3 illustrates the architecture of a downlink subframe.

FIG. 3 illustrates the architecture of a downlink subframe.

In FIG. 3, assuming the normal CP, one slot includes seven OFDM symbols, by way of example.

The downlink (DL) subframe is split into a control region and a data region in the time domain. The control region includes up to first three OFDM symbols in the first slot of the subframe. However, the number of OFDM symbols included in the control region may be changed. A physical downlink control channel (PDCCH) and other control channels are assigned to the control region, and a PDSCH is assigned to the data region.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual NB IoT UEs in any NB IoT UE group, and/or activation of a voice over Internet protocol (VoIP).

A base station determines a PDCCH format according to the DCI to be transmitted to an NB IoT UE and attaches a cyclic redundancy check (CRC) to control information. The CRC is masked with a unique identifier (radio network temporary identifier (RNTI)) depending on the owner or purpose of the PDCCH. If the PDCCH is for a specific NB IoT UE, the CRC may be masked with the unique identifier of the NB IoT UE, for example, a cell-RNTI (C-RNTI). If the PDCCH is for a paging message, the CRC may be masked with a paging indicator, for example, a paging-RNTI (P-RNTI). If the PDCCH is for a system information block (SIB), the CRC may be masked with a system information identifier, for example, a system information-RNTI (SI-RNTI). In order to indicate a random access response that is a response to the transmission of a random access preamble by the NB IoT UE, the CRC may be masked with a random access-RNTI (RA-RNTI).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

<Discontinuous Reception (DRX)>

Hereinafter, discontinuous reception (DRX) in 3GPP LTE will be described.

The DRX allows a terminal to monitor a downlink channel discontinuously in order to reduce battery consumption of a radio device.

Figure 4:
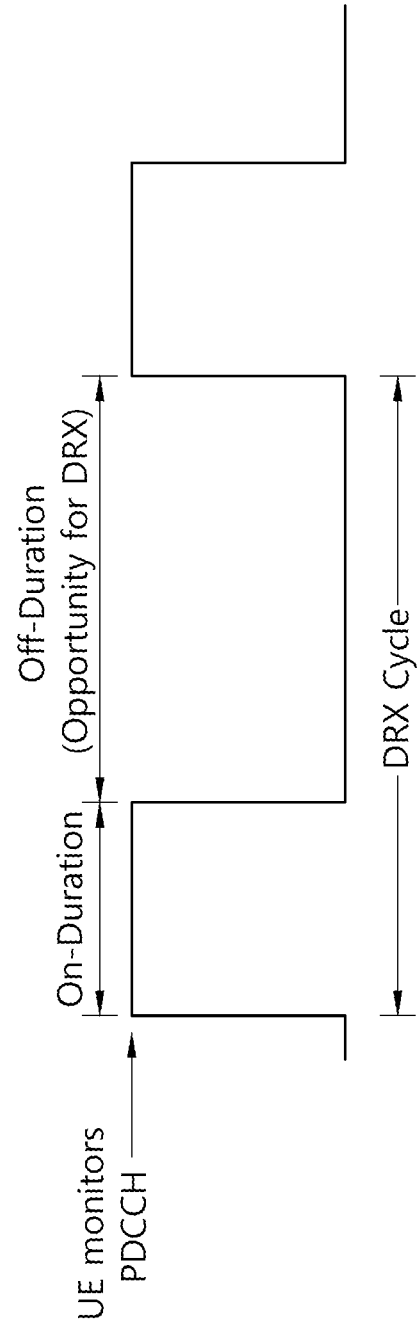
FIG. 4 illustrates an example of a DRX cycle.

FIG. 4 illustrates an example of a DRX cycle.

A DRX cycle specifies periodic repetition of On Duration followed by a possible period of inactivity. The DRX cycle includes On Duration and Off Duration. On Duration is a period of time in which a UE monitors a PDCCH in a DRX cycle.

Once DRX is set, a UE may monitor a PDCCH during On Duration but may not monitor a PDCCH during Off Duration.

To define On Duration, an onDuration timer is used. The On Duration may be defined as a period in which the onDuration timer is being operated. The onDuration timer specifies the number of consecutive PDCCH-subframe(s) at the beginning of the DRX cycle. A PDCCH-subframe indicates a subframe that is monitored by a PDCCH.

In addition to a DRX cycle, other periods in which a PDCCH is monitored may be defined. A time duration during which a PDCCH is monitored is collectively referred to Active time. The Active time may consist of an On Duration during which an UE periodically monitors the PDCCH, and a time duration during which the UE monitors the PDCCH upon occurrence of an event.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

Hereinafter, the IoT will be described.

Figure 5A:
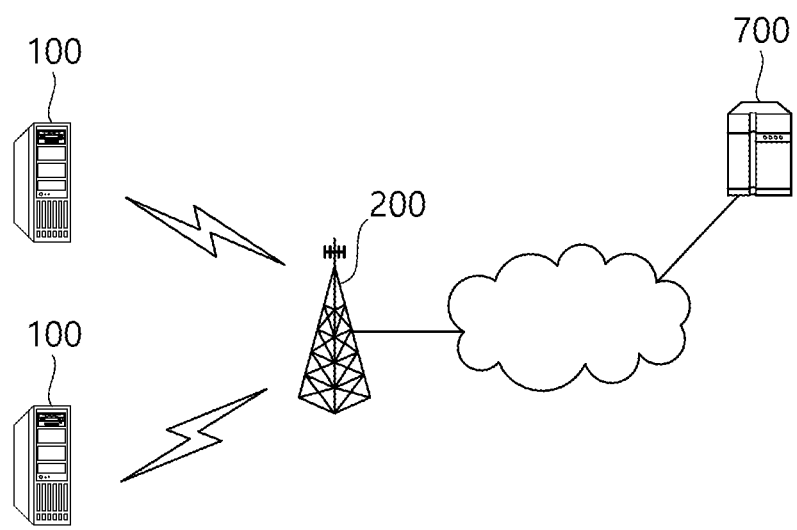
FIG. 5A illustrates an example of IoT (Internet of Things) communication.

FIG. 5A illustrates an example of IoT (Internet of Things) communication.

The IoT refers to information exchange between the IoT devices 100 without human interaction through the base station 200 or information exchange between the IoT device 100 and the server 700 through the base station 200. In this way, the IoT communication may be also referred to as Cellular Internet of Things (CIoT) in that it communicates with a cellular base station.

Such IoT communication is a type of machine-type communication (MTC). Therefore, the IoT device may be referred to as an MTC device.

The IoT service is distinct from the service in the conventional human intervention communication and may include various categories of services such as tracking, metering, payment, medical service, and remote control. For example, the IoT services may include meter reading, water level measurement, use of surveillance cameras, inventory reporting of vending machines, and so on.

Since the IoT communication has a small amount of data to be transmitted and uplink or downlink data transmission and reception rarely occur, it is desirable to lower the cost of the IoT device 100 and reduce battery consumption depending on a low data rate. Further, since the IoT device 100 has low mobility characteristics, the IoT device 100 has characteristics that the channel environment changes little.

Figure 5B:
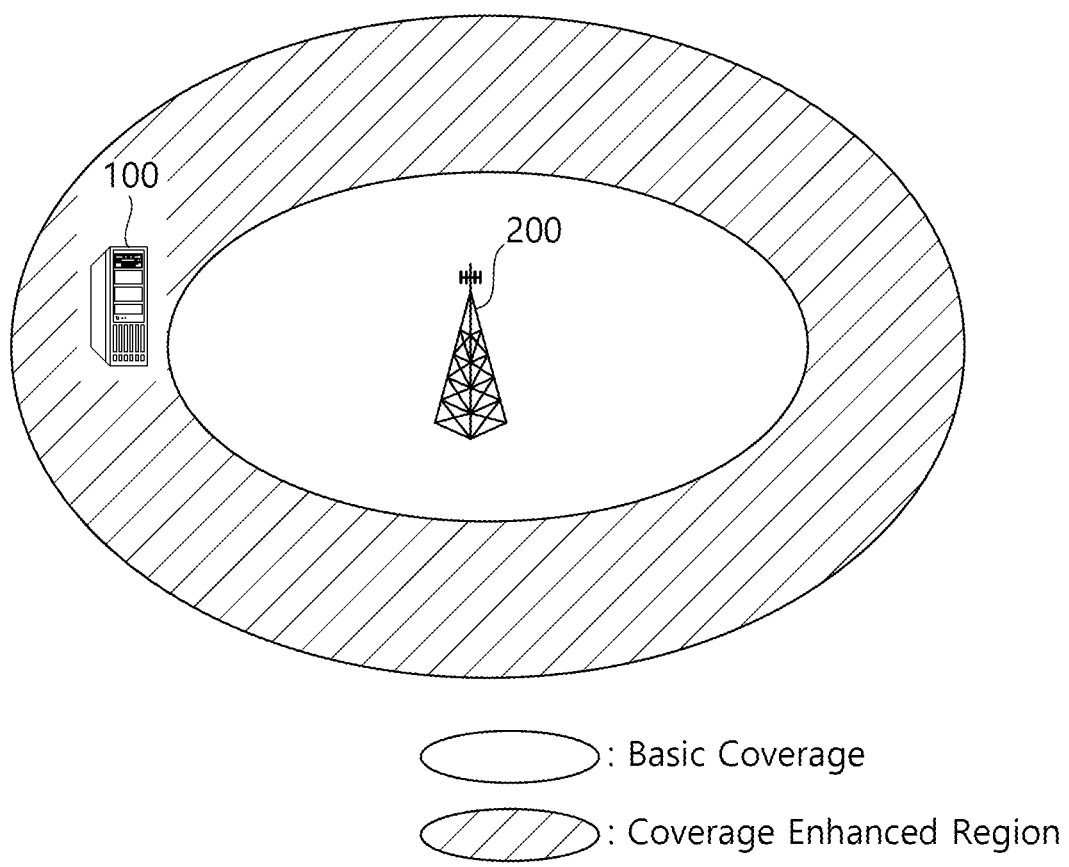
FIG. 5B is an illustration of cell coverage extension or enhancement for an IoT device.

FIG. 5B is an illustration of cell coverage extension or enhancement for an IoT device.

Recently, extending or enhancing the cell coverage of the base station for the IoT device 100 has been considered, and various techniques for extending or enhancing the cell coverage have been discussed.

However, when the coverage of the cell is extended or enhanced, if the base station transmits a downlink channel to the IoT device located in the coverage extension (CE) or coverage enhancement (CE) region, then the IoT device has difficulty in receiving it. Similarly, when an IoT device located in the CE region transmits an uplink channel, the base station has difficulty in receiving it.

In order to solve this problem, a downlink channel or an uplink channel may be repeatedly transmitted over multiple subframes. Repeating the uplink/downlink channels on multiple subframes is referred to as bundle transmission.

Figure 5C:
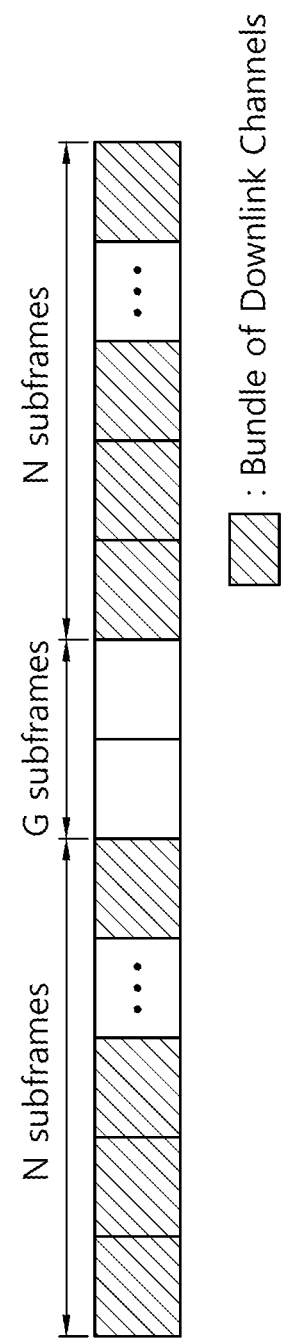
FIG. 5C illustrates an example of transmitting a bundle of downlink channels.

FIG. 5C illustrates an example of transmitting a bundle of downlink channels.

As illustrated in FIG. 5C, a base station repeatedly transmits a downlink channel (e.g., a PDCCH and/or a PDSCH) to an IoT device 100 located in a CE region on a plurality of subframes (e.g., N subframes).

The IoT device or the base station receives a bundle of downlink/uplink channels on a plurality of subframes and decodes a portion of the bundle or the entire bundle, thereby increasing the decoding success rate.

Figure 6A:
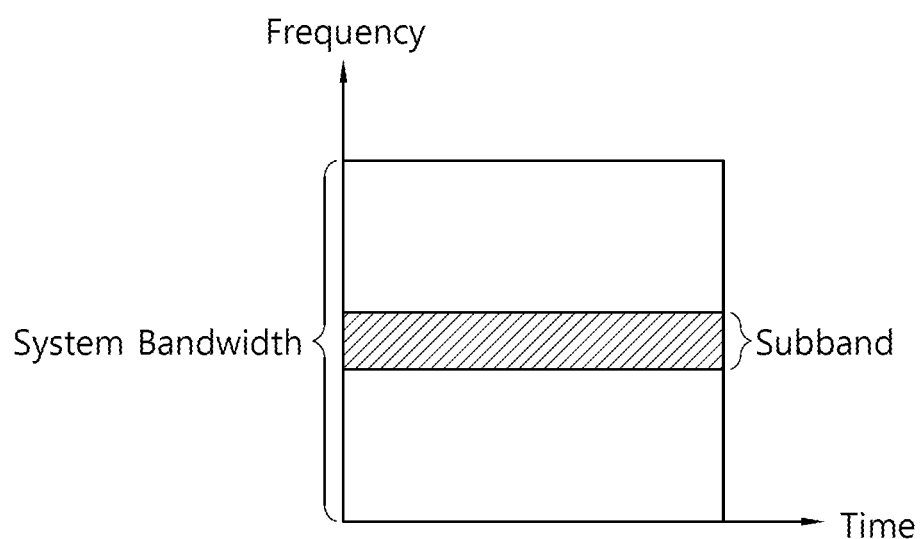
FIGS. 6A and 6B are diagrams illustrating examples of sub-bands in which IoT devices operate.
Figure 6B:
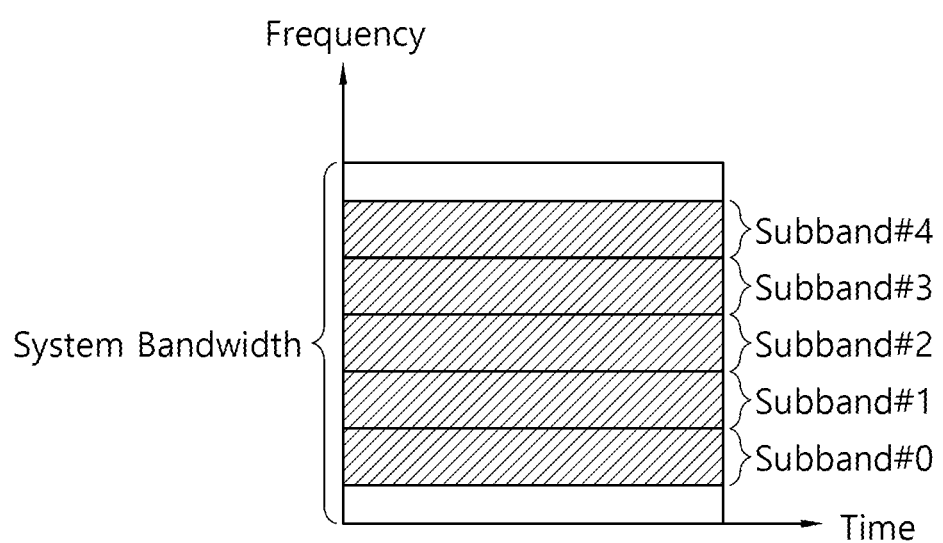

FIGS. 6A and 6B are diagrams illustrating examples of sub-bands in which IoT devices operate.

As one method for low-cost IoT devices, regardless of the system bandwidth of the cell as shown in FIG. 5A, the IoT device may use a sub-band of about 1.4 MHz for example.

In this case, an area of the subband in which the IoT device operates may be positioned in a central region (e.g., six middle PRBs) of the system bandwidth of the cell as shown in FIG. 5A.

Alternatively, as shown in FIG. 5B, a plurality of sub-bands of the IoT device may be used in one sub-frame for intra-subframe multiplexing between IoT devices to use different sub-bands between IoT devices. In this case, the majority of IoT devices may use sub-bands other than the central region of the system band of the cell (e.g., six middle PRBs).

The IoT communication operating on such a reduced bandwidth can be called NB (Narrow Band) IoT communication or NB CIoT communication.

Figure 7:
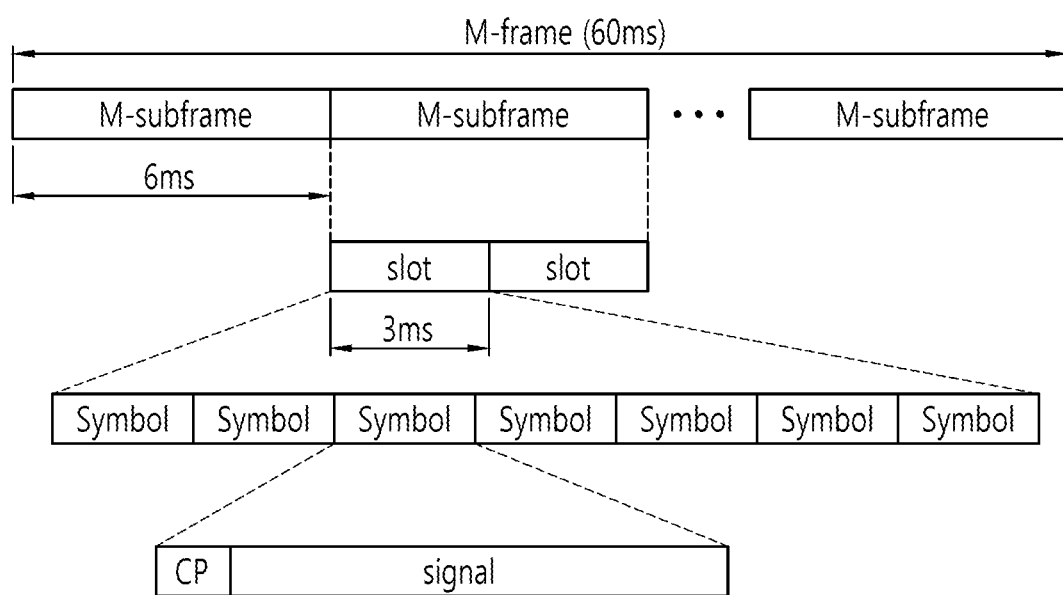
FIG. 7 illustrates an example of time resources that can be used for NB-IoT in M-frame units.

FIG. 7 illustrates an example of time resources that can be used for NB-IoT in M-frame units.

Referring to FIG. 7, a frame that may be used for the NB-IoT may be referred to as an M-frame, and the length may be illustratively 60 ms. Also, a subframe that may be used for the NB IoT may be referred to as an M-subframe, and the length may be illustratively 6 ms. Thus, an M-frame may include 10 M-subframes.

Each M-subframe may include two slots, and each slot may be illustratively 3 ms.

However, unlike what is shown in FIG. 7, a slot that may be used for the NB IoT may have a length of 2 ms, and thus the subframe has a length of 4 ms and the frame may have a length of 40 ms. This will be described in more detail with reference to FIG. 7.

Figure 8:
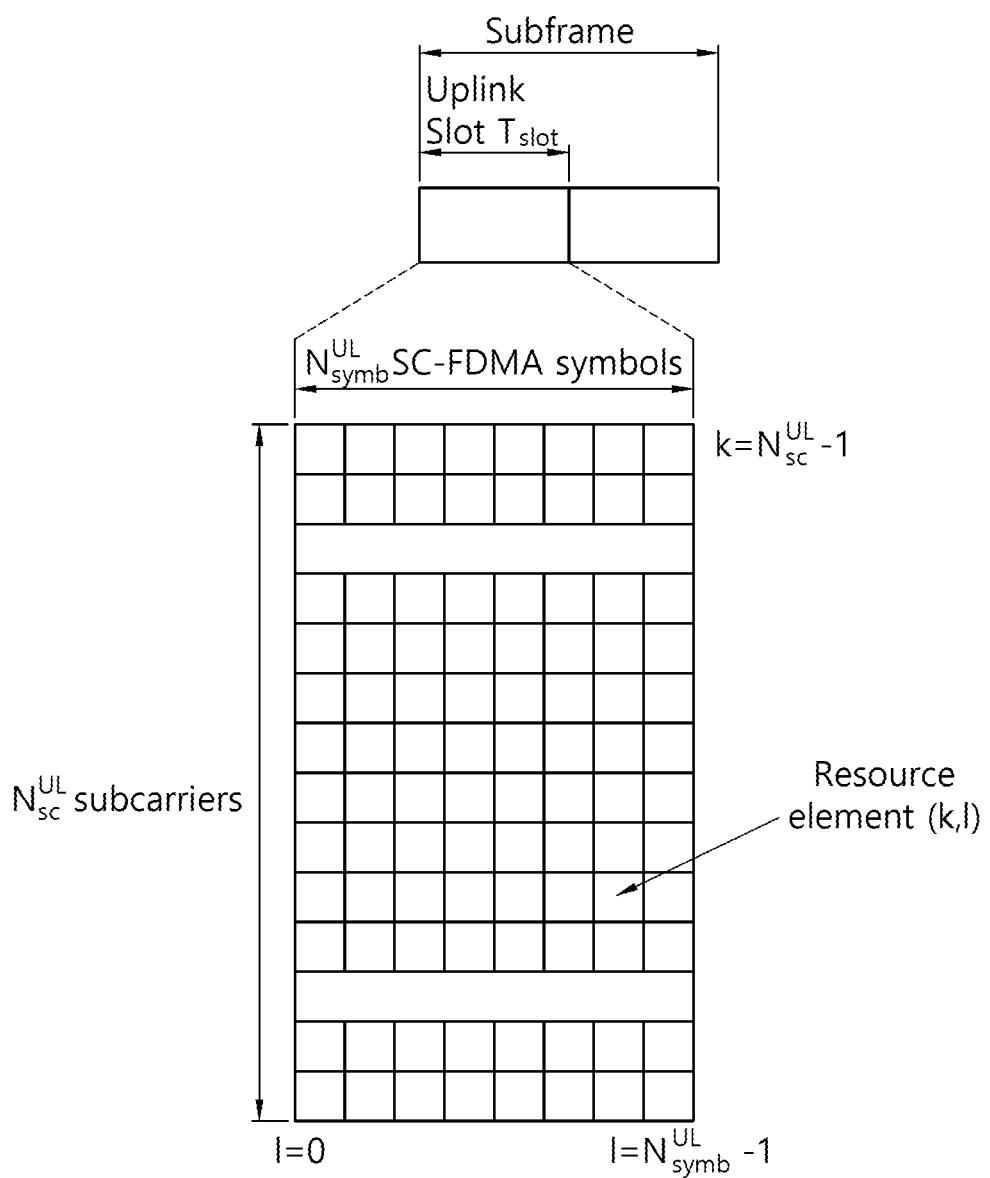
FIG. 8 illustrates another example of time resources and frequency resources that can be used for NB IoT.

FIG. 8 illustrates another example of time resources and frequency resources that can be used for NB IoT.

Referring to FIG. 8, a physical channel or a physical signal transmitted on a slot in an NB-IoT uplink includes $N_{symb}^{UL}$ SC-FDMA symbols in the time domain and $N_{sc}^{UL}$ subcarriers in the frequency domain. The uplink physical channel may be divided into a narrowband physical uplink shared channel (NPUSCH) and a narrowband physical random access channel (NPRACH). In NB-IoT, the physical signal may be a narrowband demodulation reference signal (NDMRS).

In NB-IoT, an uplink bandwidth for $N_{sc}^{UL}$ subcarriers for $T_{slot}$ is illustrated as below.

TABLE 1

| Subcarrier spacing | $N_{sc}^{UL}$ | $T_{slot}$ |
|---|---|---|
| $\Delta f = 3.75$ kHz | 48 | $61440*T_s$ |
| $\Delta f = 15$ kHz | 12 | $15360*T_s$ |

In NB-IoT, each resource element (RE) in a resource grid may be defined as an index pair (k, l) in a slot when the time domain and the frequency domain indicate k=0, . . . , $N_{sc}^{UL}-1$ and l=0, . . . , $N_{symb}^{UL}-1$, respectively. In NB-IoT, a downlink physical channel includes a narrowband physical downlink shared channel (NPDSCH), a narrowband physical broadcast channel (NPBCH), and a narrowband physical downlink control channel (NPDCCH). A downlink physical signal includes a narrowband reference signal (NRS), a narrowband synchronization signal (NSS), and a narrowband positioning reference signal (NPRS). The NSS includes a narrowband primary synchronization signal (NPSS) and a narrowband secondary synchronization signal (NSSS). NB-IoT is a communication method for a wireless device using a reduced bandwidth (i.e., a narrowband) according to low complexity and low cost. NB-IoT communication is aimed at enabling a large number of wireless devices to be connected in the reduced bandwidth. Further, NB-IoT communication is aimed at supporting wider cell coverage than that in existing LTE communication.

Referring to Table 1, a carrier having a reduced bandwidth includes only one PRB when the subcarrier spacing is 15 kHz. That is, NB-IoT communication may be performed using only one PRB. Here, assuming that an NPSS/NSSS/NPBCH/SIB-NB is transmitted from a base station, a PRB that a wireless device access in order to receive the NPSS/NSSS/NPBCH/SIB-NB may be referred to as an anchor PRB (or anchor carrier). The wireless device may be allocated an additional PRB by the base station in addition to the anchor PRB (or anchor carrier). Here, among the additional PRBs, a PRB via which the wireless device does not expect to receive the NPSS/NSSS/NPBCH/SIB-NB from the base station may be referred to as a non-anchor PRB (or non-anchor carrier).

<Paging>

A paging procedure is a procedure for switching a terminal to an RRC-connected mode when there is downlink data to transmit to the terminal in an RRC-idle state.

Figure 9:
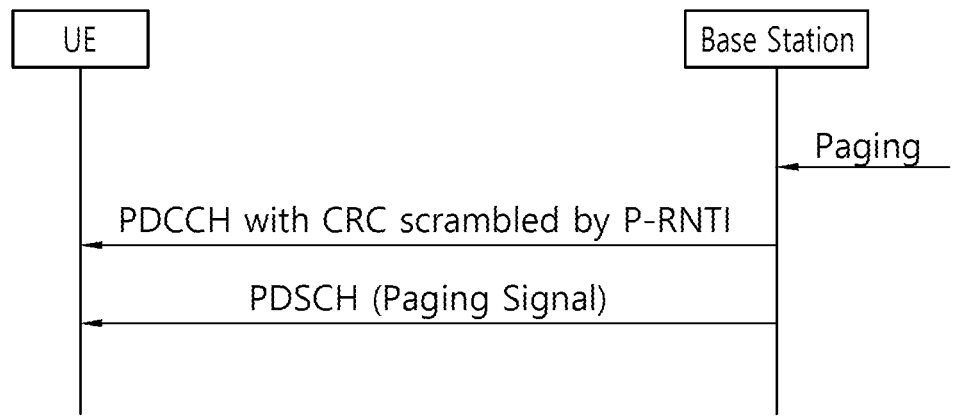
FIG. 9 illustrates a paging procedure.

FIG. 9 illustrates a paging procedure.

As illustrated in FIG. 9, when a base station receives a paging signal from a mobility management entity (MME, not shown), the base station transmits a PDCCH (or MPDCCH or NPDCCH) having a cyclic redundancy check (CRC) scrambled with a paging radio network temporary identity (P-RNIT). Next, the base station transmits a PDSCH including a paging message.

When successfully decoding the PDCCH (or MPDCCH or NPDCCH) having the CRC scrambled with the P-RNIT, a terminal decodes the paging message through the PDSCH. The terminal establishes an RRC connection procedure in order to enter the RRC-connected mode.

As described above, the terminal needs to monitor the PDCCH (or MPDCCH or NPDCCH) in order to receive the paging message. However, when the monitoring period is short, a period for the terminal to perform blind decoding (BD) is short, causing an increase in power consumption.

<Disclosure of the Specification>

To solve the foregoing problem, disclosures of the present specification propose introducing a new signal, for example, a wake-up signal (WUS). That is, disclosures of the present specification propose methods for reducing the power consumption of a terminal using a WUS.

Figure 10A:
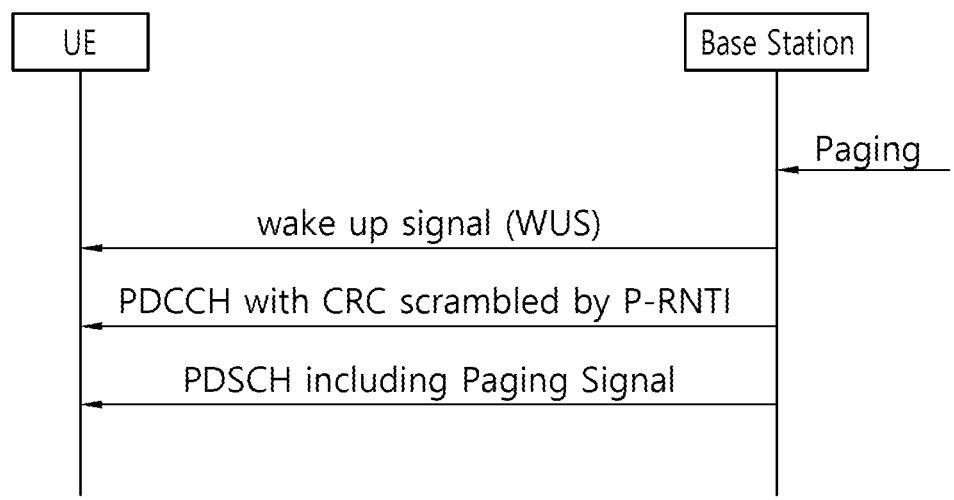
FIG. 10A is a flowchart illustrating an example of using a WUS introduced according to a disclosure of the present specification.
Figure 10B:
FIG. 10B illustrates a WUS in a time domain.

FIG. 10A is a flowchart illustrating an example of using a WUS introduced according to a disclosure of the present specification, and FIG. 10B illustrates a WUS in a time domain.

As illustrated in FIG. 10A, a base station may transmit a WUS before transmitting a PDCCH (or MPDCCH or NPDCCH). Upon receiving the WUS, a wireless device may monitor the PDCCH (or MPDCCH or NPDCCH) in order to attempt to receive a paging message. One WUS may indicate that a plurality of paging messages is received. In this case, when the wireless device receives one WUS, the wireless device may monitor a PDCCH (or MPDCCH or NPDCCH) on a plurality of subframes in order to attempt to receive a plurality of paging messages.

Referring to FIG. 10B, an interval in which a wireless device needs to monitor a WUS may be defined as a wake-up signal occasion (WUSO). Specifically, a time interval in which a WUS actually exists in the time domain is referred to as a WUSO. That is, a time interval in which a base station transmits a WUS may be referred to as a WUSO. A method proposed in the specification may be applied to NB-IoT. Therefore, for the convenience of explanation, a disclosure of the present specification will be described hereinafter from the perspective of an NB-IoT wireless device that needs to monitor an NPDCCH. However, disclosures of the present specification may also generally be applied to other systems using a WUS. Further, for the convenience of explanation, although the following description will be made mainly about operations of monitoring an NPDCCH and performing blind decoding in order to receive a paging message, disclosures of the present specification may also be applied in order to reduce power consumption in performing blind decoding of a general physical channel. For example, the methods described in the present specification may also be applied to a process in which a wireless device in an RRC-connected mode monitors a UE-specific search space (USS) when maintaining a C-DRX mode.

Further, although the following description will be made mainly about an operation in which the wireless device monitors an NPDCCH and then wakes up when the base station transmits a WUS to the wireless device, this operation may also be applied to a go-to-sleep operation of transmitting information (or a signal) such that the wireless device does not monitor an NPDCCH.

I. First Disclosure: Information Included in WUS

This section proposes a method of transmitting specific information using a WUS.

This information may be expressed in a sequence. For example, the WUS may be expressed using a Zadoff-Chu sequence. For example, the information can be distinguished by the position of the sequence in the time domain. Further, the information may be expressed using a tone selection-based method. Specifically, the information may be distinguished by a tone-hopping pattern in a particular time domain. This method may be equivalent to a method using a frequency-hopping pattern used for an NPRACH. In addition, the information may be expressed using the position of a symbol (or other distinguishable time-domain resource units) where a particular sequence exists. For example, when an mth sequence among a total of n sequences is positioned at an lth symbol in one subframe and is positioned at an l'th symbol, different pieces of information may be expressed. Furthermore, the information may be expressed using a method based on an NPDCCH or PHICH. In addition, the information included in the WUS may be expressed using a physical channel, such as DCI.

When information is expressed using a WUS, the information may be used to indicate a frequency resource domain in which a wireless device receives a paging message after receiving the WUS. Here, a time interval in which the paging message exists may be referred to as a paging occasion (PO). That is, the PO indicates a time interval in which a base station transmits the paging message. The PO may indicate a specific subframe rather than a time interval. That is, a subframe in which the transmission of the paging message starts may be referred to as a PO. The wireless device receives the paging message in the PO, which may be for the base station to temporarily control paging loads using the WUS. When information is expressed using a WUS, the information may be used to indicate the update of system information (e.g., an MIB or SIB). For example, regarding NB-IoT information the content of which does not frequently change, such as an NPBCH or NB-SIB1, the wireless device reads the WUS before reading the NPBCH or NB-SIB1, thereby checking in advance whether the information has changed. In another example, when the wireless device in an RRC-suspended mode switches to the RRC-connected mode, the information may be used to indicate whether RRC signaling is updated, which may reduce the time to obtain the system information, thereby reducing the power consumption and latency of the wireless device.

When specific information is expressed using a WUS, the information may be for subdividing an identifier (e.g., UE_ID) or a group identifier of a wireless device to receive a paging message. For example, wireless devices that perform monitoring in the same WUSO may belong to a group that performs monitoring in the same PO. In another example, a base station may use information included in a WUS in order to separate a subgroup of wireless devices to which the base station actually transmit a paging message from the wireless devices in one group. Specifically, when there are a total of N wireless devices that perform monitoring in a specific PO and these wireless devices are divided into M subgroups, a WUS may include a total of M pieces of information that can be distinguished from each other. Here, when a wireless device monitors a WUSO and receives the WUS, the wireless device may obtain information on a subgroup to which the wireless device belongs from the information included in the WUS.

There are various methods of representing information using a WUS in addition to the methods proposed above, and some examples will be illustrated later.

II. Second Disclosure: WUSO Configuration

A specific interval for monitoring a WUS may be defined as a WUSO window, which will be described in detail with reference to FIG. 11. That is, a time interval in which monitoring is performed to receive a WUS may be defined as a WUSO window.

Figure 11:
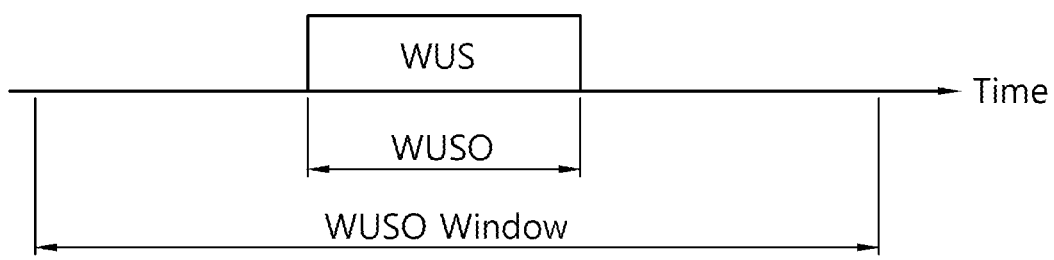
FIG. 11 illustrates a WUSO window on a time axis.

FIG. 11 illustrates a WUSO window on a time axis.

Referring to FIG. 11, a time interval in which a WUS actually exists in the WUSO window is referred to as a WUSO as described above.

In this case, a wireless device may monitor possible subframes in the WUSO window for a WUS. The size of the WUSO window may correspond to one or more subframes. Here, information about the size of a subframe and the number of subframes may be indicated through a higher-layer signal. The size of a subframe may be indicated via information included in the WUS. Alternatively, the WUSO may be a unit of a plurality of symbols or slots. The WUSO window may be set to an absolute time. In this case, the absolute time may indicate the number of consecutive subframes regardless of the validity of the subframes. The WUS may be determined to be transmitted on a valid subframe in the WUSO window. On the contrary, when the length of the WUSO window is determined based on the number of valid subframes, the WUSO window may correspond to a subframe on which the WUS is actually transmitted. In this section, for the convenience of description, a WUSO window and a WUSO will be collectively referred to as a WUSO without distinction in the following description.

A frequency-domain resource in which a WUSO to be monitored by the wireless device exists may be in the same region as a frequency-domain resource in which a paging message to be subsequently monitored is received. Specifically, in NB-IoT, it is determined to monitor the WUSO on the same carrier as an anchor (or non-anchor) carrier on which the wireless device monitors the paging message, which is for reducing the power consumed by the wireless device in retuning a frequency when a frequency resource is changed.

The WUSO may be set to occur according to a certain period. For example, the period of the WUSO may be set to a fixed time (or the number of subframes) through a higher-layer signal. In this case, all wireless devices may apply the same period set through the higher-layer signal. Alternatively, the period of the WUSO may be set to a value specific to each wireless device. When the wireless device is assigned a WUSO period common to all wireless devices through a higher-layer signal and is assigned a WUSO set to a value specific to each wireless device, the wireless device and/or a base station may operate assuming that the period of the WUSO is set based on a shorter period among the period set through the higher-layer signal and the period specific to each wireless device. Alternatively, the period of the WUSO may be indicated via information included in the WUS. The period of the WUSO may be expressed by an absolute time (or the number of subframes) and may be determined to be the number of paging occasions (POs) that may occur between two WUSOs. When the period of the WUSO is expressed by the number of POs, the period may be set to a multiple of the period of a PO.

When the WUSO is set only in a valid subframe, if the WUSO collides with or partially or entirely overlaps the position of an invalid subframe, the WUSO may be set to be postponed after the invalid subframe. When the wireless device detects a WUS assigned thereto during the WUSO, if a PO and the WUSO collide with each other or partially or entirely overlap each other on time resources within a paging window indicated by the WUS, the wireless device may drop the WUSO and may perform monitoring during the time interval of the PO. That is, when the reception of the WUS is dropped, the reception of a paging message may be monitored during the PO corresponding to the WUSO regardless of whether the WUS is transmitted in the WUSO. This operation may be intended to reduce the power consumption of the wireless device, and the base station may schedule the WUSO assuming this operation of the wireless device. When the PO and the WUSO collide with each other or partially or entirely overlap each other on time resources in an interval other than the paging window indicated by the WUS, the wireless device may be set to monitor the WUSO.

Alternatively, when the WUSO is set to operate only in a valid subframe, if the WUSO collides with the position of an invalid subframe or partially or entirely overlaps the position of the invalid subframe on time resources, the WUSO may be set to be dropped. In this case, even though a WUS is not transmitted during a go-to-sleep operation or the like, the probability that the wireless device misses a paging message assigned thereto does not increase.

A PO may not exist during a certain gap before an interval in which the WUSO is configured. That is, the wireless device may not attempt to receive a paging message during the interval of the certain gap, which may be intended to ensure time for blind decoding of an NPDCCH in a PO. If the gap is set to be an $n_{gap\_to\_w}$ subframe as to a downlink subframe, the paging window may be set to include subframes only before the $n_{gap\_to\_w}$ subframe from the time the WUSO occurs. Further, even though the paging window includes the interval set as the gap, the wireless device may be set not to expect a PO in this interval. In this case, the size of the gap may be the same as a period set by a higher-layer signal. Alternatively, the size of the gap may be indicated via information included in the WUS.

Alternatively, there may be no WUSO during a certain gap after an interval in which a PO is set. That is, the wireless device may not attempt to receive a WUS reception during the interval of the certain gap, which may be intended to ensure time for blind decoding of an NPDCCH in a PO. In this case, even though a WUS is not transmitted during a go-to-sleep operation or the like, the probability that the wireless device misses a paging message assigned thereto does not increase.

When the WUSO and a search space for a particular purpose (e.g., a common search space (CSS) or USS) collide with each other, or partially or entirely overlap each other on time resources, the device may be set not to attempt to receive a WUS during the WUSO. Instead, the device may assume that a PDCCH (or NPDCCH) may be transmitted during the WUSO even though a WUS is not transmitted from the base station. For example, the search space for the particular purpose may be for receiving an RAR or may be a location set for an SC-PtM operation. The foregoing may be set to be applied only to a particular WUS design when two or more types of WUS designs are used. For example, it is assumed that both a design in which a WUS can be used for synchronization and a design in which a WUS is not used for synchronization are available. If one of the two designs or a combination of the two designs is determined by the base station, the foregoing may be set to be applied only to the WUS that is not used for synchronization. The WUS that is not used for synchronization refers to a design that is not easy for a wireless device to use for receiving a synchronization signal but does not necessarily indicate that the WUS is prevented from being used to obtain a synchronization signal or does not have such a function. Such an example is a long ZC sequence that is mapped with REs across a plurality of OFDM symbols, such as an NSSS.

When the WUS collides with another signal or channel or partially or entirely overlap the signal or channel on time resources, puncturing or dropping may be applied depending on the degree of the collision. For example, when there is a minor collision with another CSS, it may be set to apply puncturing. When there is a certain level or higher of a collision, it may be set to drop the WUS and to assume that an NPDCCH can be transmitted without transmitting a WUS. On the other hand, puncturing may be applied to wireless devices that are located in a specific coverage-extended area and repeat reception. Dropping may be, from the perspective of the base station, for preventing the transmission of a meaningless WUS if the size of a WUS to be punctured is excessively large. Further, dropping may be, from the perspective of the wireless device, for preventing deterioration in performance due to a short WUS. Here, a criterion for determining one of puncturing and dropping may be set to the number of absolute time-domain units (e.g., symbols or subframes) in which the collision of a WUS occurs. Alternatively, the criterion for determining one of puncturing or dropping may be set to the ratio of collisions occurring in a set WUS interval. The criterion values may be predetermined fixed values or may be set by the base station and may be indicated to the wireless device via a higher-layer signal.

The definition and setting of a paging window among the foregoing descriptions follow a description in a second disclosure. In a system that does not require a paging window, a paging window may correspond to any interval for monitoring a PO between WUSOs without any specific definition.

The WUSO may be determined by one of the following methods.

II-1: First Method of Second Disclosure

A WUSO window may be defined as an offset ($n_{w\_offset}$) for a PO.

Figure 12A:
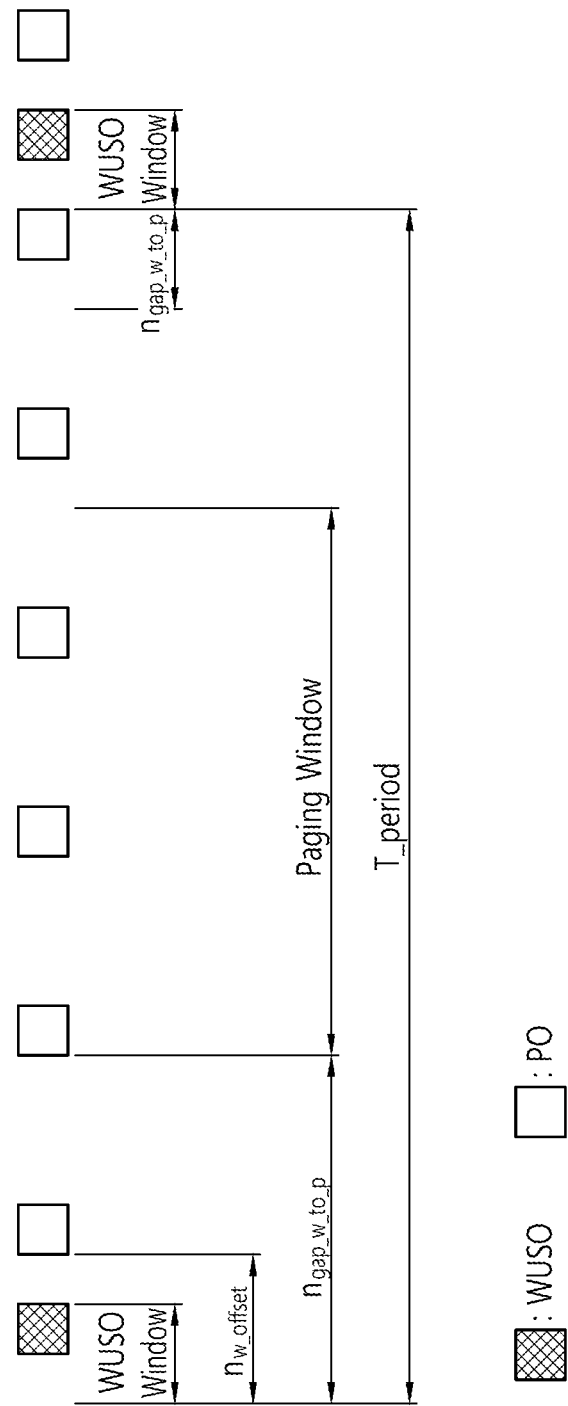
FIG. 12A illustrates a first method of a second disclosure.

FIG. 12A illustrates a first method of the second disclosure.

FIG. 12A shows a method of determining a WUSO window according to the first method of the second disclosure. However, unlike in the drawing, other methods using a WUS are also possible.

For example, when a PO is configured in a particular nth subframe, the start subframe of a WUSO window may be determined to be an $n-n_{w\_offset}$th subframe. Here, the value of $n_{w\_offset}$ may be a value set by a higher-layer parameter. When the value of $n_{w\_offset}$ is not set, a wireless device may use a preset default value. Alternatively, the value of $n_{w\_offset}$ may be a value determined by an identifier (e.g., UE_ID) of the wireless device. Here, the WUSO window may be set by subdividing the identifier (e.g., UE_ID) of the wireless device used to determine the PO. For example, the value of $n_{w\_offset}$ for determining the WUSO window based on the identifier (e.g., UE_ID) of the wireless device may be defined by the following equation.

$$n_{w\_offset}=f(\text{UE\_ID} \bmod \alpha) \qquad \text{[Equation 1]}$$

Here, f (x) is a function of matching the value of $n_{w\_offset}$ and x, and may exist in a predefined table, where α is a specified constant value, which may be used for dividing wireless devices having a wireless device identifier (e.g., UE_ID) into a subgroups. Here, α may be indicated via a higher-layer signal and/or information represented using a WUS.

Alternatively, the value of $n_{w\_offset}$ may be indicated via information included in a WUS. The indicated value of $n_{w\_offset}$ may be used to dynamically control the WUSO that the wireless device needs to monitor subsequently. For example, if the information about $n_{w\_offset}$ included in the WUS is A, the value of $n_{w\_offset}$ for determining the WUSO based on the information may be defined by the following equation.

$$n_{w\_offset}=f(A) \qquad \text{[Equation 2]}$$

Here, f (x) is a function of matching the value of $n_{w\_offset}$ and x, and may exist in a predefined table.

The defined value of $n_{w\_offset}$ may be counted considering only valid subframes, which may be for preventing the gap between the WUSO and the PO from changing or for preventing the WUS from not being sufficiently repeated due to the number of invalid subframes. Alternatively, the defined value of $n_{w\_offset}$ may be counted considering absolute time units. That is, all subframes may be counted regardless of valid/invalid subframes, which may be for preventing the time from WUS monitoring to the reception of a paging message from excessively increasing due to a change in the position of the start subframe of the WUSO depending on the number of invalid subframes.

A period in which the WUSO window occurs may be different from a period in which the PO occurs. When the period in which the WUSO window occurs is defined as $T_{period}$, the WUSO may be set to occur at the position of a PO offset that occurs every $T_{period}$. For example, $T_{period}$ may have the same length as the eDRX length. In this case, when the wireless device, which has been in the sleeping mode for the eDRX length, starts the active mode, the WUSO may be used for determining whether to monitor an NPDCCH in the interval of the active mode. If no wake-up command is detected or a go-to-sleep command is detected in the WUSO, the wireless device may not monitor an NPDCCH in the interval of the active mode.

When the position of the start subframe of the WUS determined by the offset corresponds to an invalid subframe, the position of the start subframe of the WUS may be set to the position of the closest valid subframe that exists after the position of a subframe designated as the offset. Alternatively, the position of the start subframe may be set to be the same, and the interval of the invalid subframe may be punctured instead.

The above description may be modified to determine the end time (or ending occasion) of the WUSO window based on the offset, which may be for always ensuring that the gap between the WUSO window and the PO is always a certain size. Here, the size of the gap may be an absolute time and may be obtained by counting all subframes regardless of valid/invalid subframes.

The methods proposed above may be modified such that a start offset for configuring a start subframe and an end offset for configuring an end subframe are used at the same time, which will be described in detail with reference to FIG. 12B.

Figure 12B:
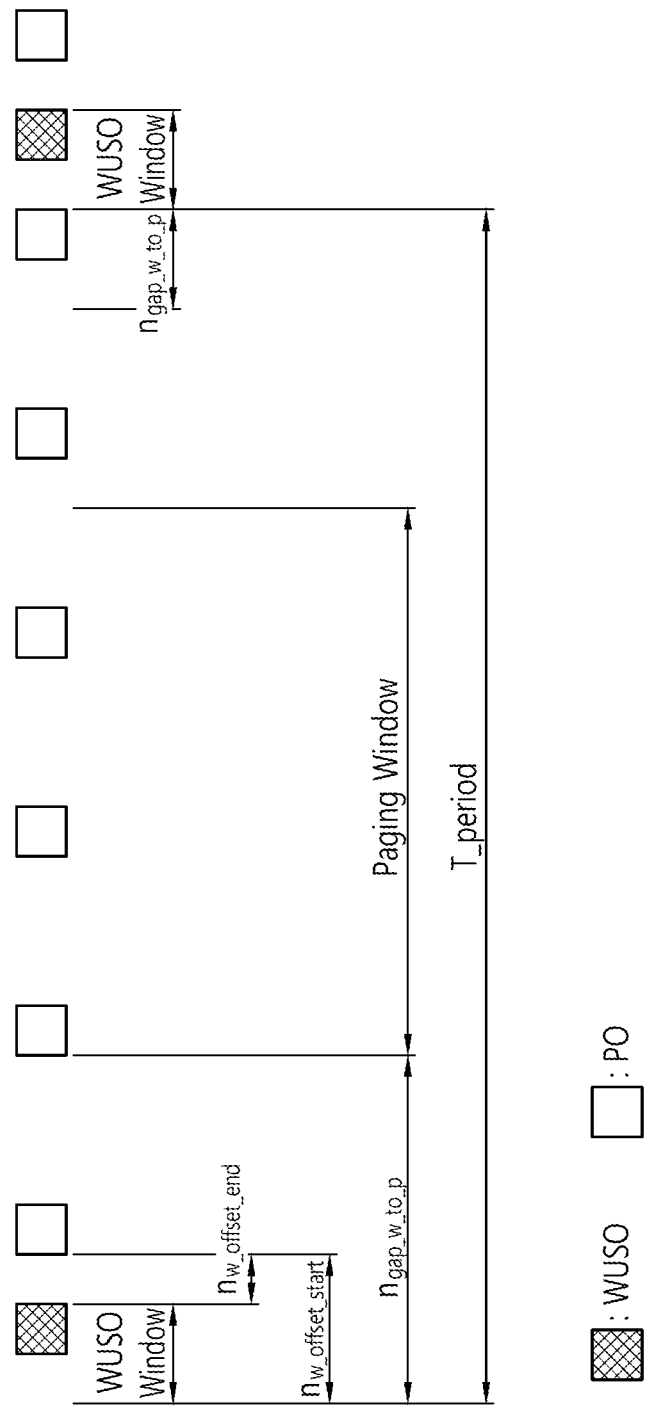
FIG. 12B illustrates a modification of the first method of the second disclosure.

FIG. 12B illustrates a modification of the first method of the second disclosure.

As illustrated in FIG. 12B, a WUSO window may be defined as an interval between a position indicated by a start offset ($n_{w\_offset}$ start) and a position indicated by an end offset ($n_{w\_offset}$ end). Here, the transmission of a WUS may be started at the position of the start subframe of the WUSO or may be ended at the position of the end subframe. If the number of valid subframes is insufficient to repeat the WUS in the interval of the WUSO, it may be set to transmit the WUS during only a possible time instead of repeating the WUS during the entire interval.

II-2: Second Method of Second Disclosure

According to another method of determining a WUSO, a fixed position determined by a higher-layer signal may be used. For example, the position of the WUSO may be indicated using a bit map via an SIB. In this case, it is possible to set an invalid subframe as a subframe corresponding to the WUSO. In another example, the position of the WUSO may be indicated via an SIB to appear every specified period. In this case, it is possible to reduce overhead for representing the position corresponding to the WUSO. These two illustrated examples may be used independently of each other or may be used in combination.

Possible positions for the WUSO indicated via a higher-layer signal may be subdivided and selectively used by wireless device identifiers (e.g., UE_ID). For example, if there are a total of N possible positions for the WUSO indicated via a higher-layer signal, wireless device identifiers (e.g., UE_ID) may be divided into a total of M subgroups for use, where M is a value smaller than N, and a value obtained by dividing N by an integer may be used. In this case, each subgroup may be mapped to the same number of WUSOs. For example, when there are N available WUSO positions, a subgroup for monitoring an $n_{w\_HLS}$th position may be set to satisfy the following equation.

$$\left\lfloor n_{w\_HLS} * \frac{M}{N} \right\rfloor = \text{UE\_ID} \bmod M \qquad \text{[Equation 3]}$$

M may be indicated to a wireless device through a higher-layer signal and/or information expressed using a WUS.

Possible positions for the WUSO indicated via a higher-layer signal may be subdivided and selectively used by wireless device identifiers (e.g., UE_ID). For example, if a bit map expressed via a higher-layer signal has a size of $N_{bm}$, wireless devices may be divided into a total of M subgroups for use, where M is a value smaller than N, and a value obtained by dividing N by an integer may be used. In this case, the respective subgroups may be mapped to different numbers of WUSOs. For example, when the bit map having the size of $N_{bm}$ is used, a subgroup for monitoring an $n_{w\_HLS}$th position may be set to satisfy the following equation.

$$\left\lfloor n_{w\_HLS} * \frac{M}{N_{bm}} \right\rfloor = \text{UE\_ID} \bmod M \qquad \text{[Equation 4]}$$

M may be indicated to a wireless device through a higher-layer signal and/or information expressed using a WUS.

Figure 13:
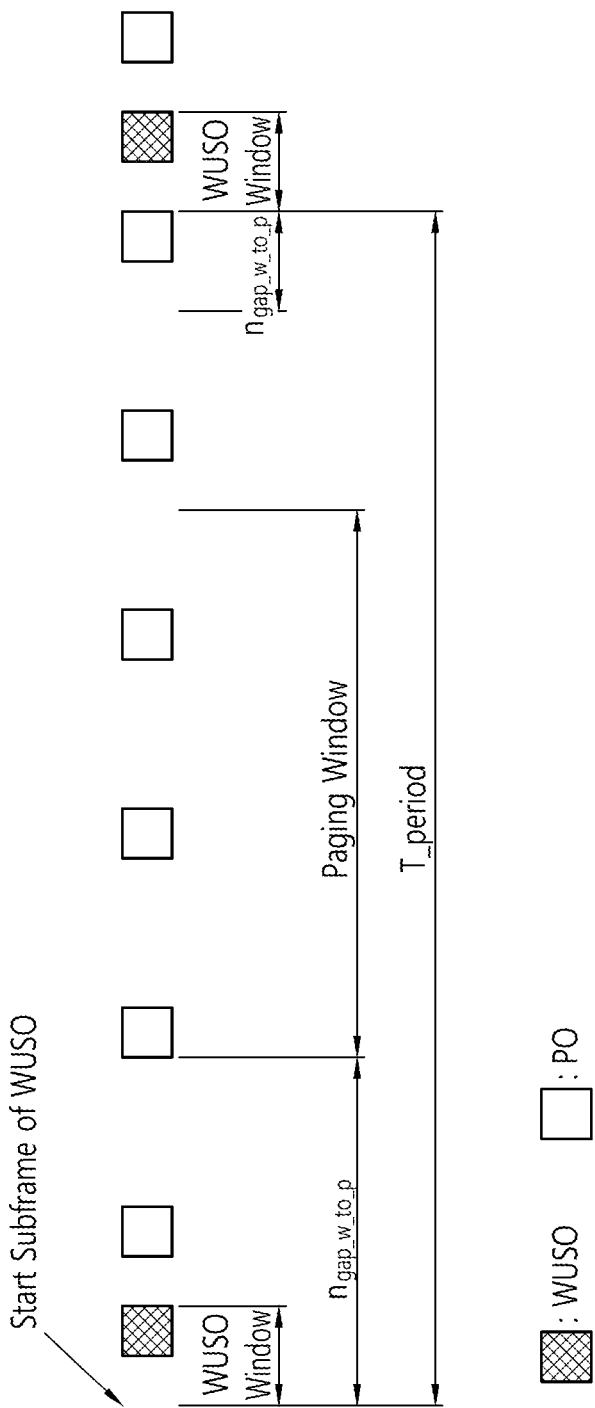
FIG. 13 illustrates the second method of the second disclosure.

FIG. 13 illustrates the second method of the second disclosure.

FIG. 13 shows a method of determining a paging window using a WUS according to the second method of the second disclosure. However, unlike in the drawing, other methods using a WUS are also possible.

II-3: Third Method of Second Disclosure

II-3-1: First Example of Third Method of Second Disclosure

According to still another method of determining a WUSO, an existing PO definition may be reused. In this case, a portion of the positions set for a PO may be used for a WUSO, and the remaining portion thereof may be used for the PO. This method may be considered as a special case of the first method. As in the first method, if only a single WUSO is used without subdivision for a group sharing the same PO, the same effect is exhibited as in a method in which $n_{w\_offset}$ is set to 0. As in the first method, if subdivision is applied to a group sharing the same PO, $n_{w\_offset}$ may be set to one of integer multiples of the periodic paging DRX of the PO. For example, $n_{w\_offset}$ for determining the WUSO may be defined by the following equation.

$$n_{w\_offset} = c * \text{paging DRX} * (\text{UE\_ID} \mod \alpha) \quad \text{[Equation 5]}$$

Here, $\alpha$ is a specified constant value and denotes the number of subgroups for subdividing wireless devices having a wireless device identifier (e.g., UE_ID). Here, c is a specified constant value, which may be an integer value, and may be designated through a higher-layer parameter and/or information expressed using a WUS. Alternatively, c may be a predefined fixed value.

When a position used for a WUSO collides with a channel or subframe for a different use, the WUSO may be set to be postponed to the position of the next PO.

When the described method is applied, a wireless device may attempt to detect both a WUS and a paging message in a PO designated as a WUSO. This method may be intended to allow a base station to transmit a paging message, without transmitting a WUS, at the position designated as the WUSO, thereby ensuring flexibility.

The illustrated first example may be intended to ensure flexibility for a wireless device in the RRC-connected mode.

Figure 14:
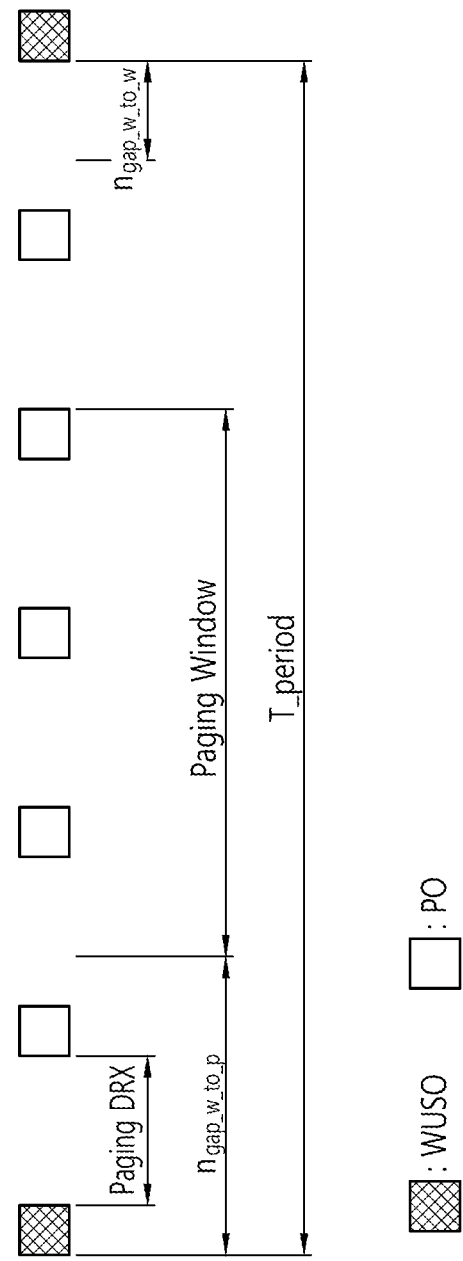
FIG. 14 illustrates a first example of a third method of the second disclosure.

FIG. 14 illustrates the first example of the third method of the second disclosure.

FIG. 14 shows a method of determining a paging window using a WUS according to the first example of the third method of the second disclosure. However, unlike in the drawing, other methods using a WUS are also possible.

II-3-2: Second Example of Third Method of Second Disclosure

In a method of using an existing PO as a WUSO, a position where a WUSO occurs may be set to a fixed position determined by a higher-layer signal. For example, the position of the WUSO may be indicated using a bit map via an SIB. This method may be considered as a special case of the second method. Subframe indexes represented by the bit map may be set only for subframes set as a PO. If the number of subframes that can be represented by the bit map is $N_{PO}$, each bit represents each of $N_{PO}$ POs. If subdivision is applied to a group of wireless devices sharing the same PO as in the second method, a subgroup using an $n_{w\_offset}$th PO as a WUSO may be set to satisfy the following equation.

$$\left\lfloor n_{w\_HLS} * \frac{M}{N_{PO}} \right\rfloor = \text{UE\_ID} \mod M \quad \text{[Equation 6]}$$

M may be indicated to a wireless device through a higher-layer signal and/or information expressed using a WUS.

When the above method is applied, a wireless device may attempt to detect both a WUS and a paging message in a PO designated as a WUSO. This method may be intended to allow a base station to transmit a paging message, without transmitting a WUS, at the position designated as the WUSO, thereby ensuring flexibility.

Figure 15:
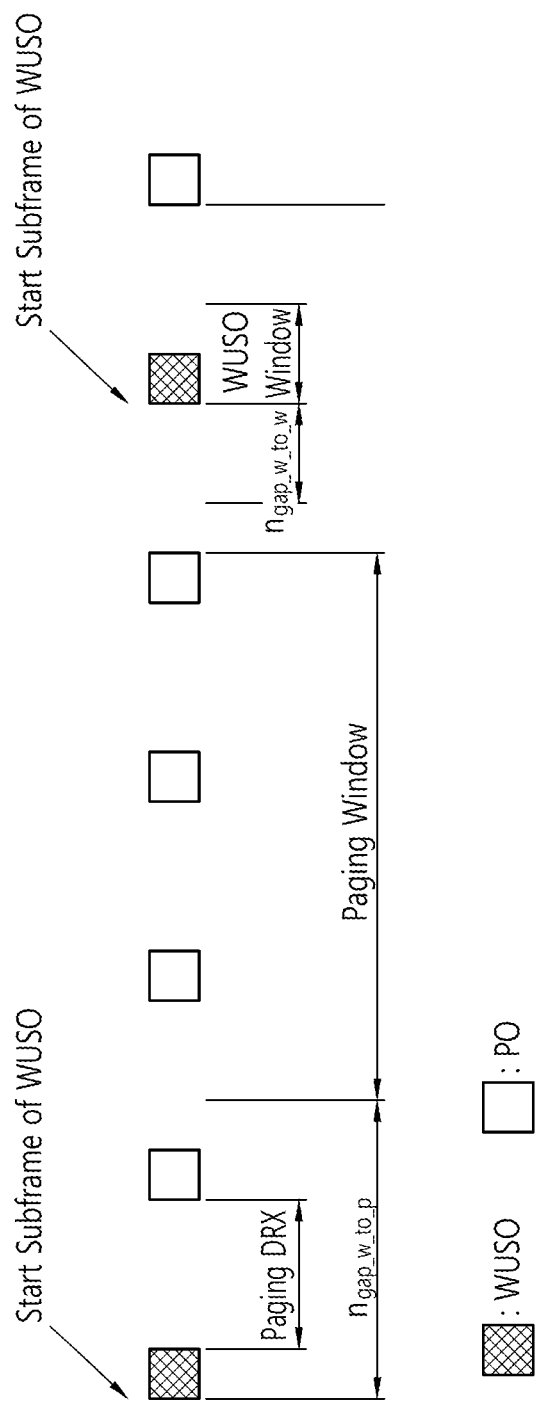
FIG. 15 illustrates a second example of the third method of the second disclosure.

FIG. 15 illustrates a second example of the third method of the second disclosure.

FIG. 15 shows a method of determining a paging window using a WUS according to the second example of the third method of the second disclosure. However, unlike in the drawing, other methods using a WUS are also possible.

II-3-3: Third Example of Third Method of Second Disclosure

In a method of using an existing PO as a WUSO, a position where a WUSO occurs may be set arbitrarily by a base station. In this method, a wireless device determines that a WUSO is possible in all POs. Therefore, the wireless device may perform both an operation of monitoring a WUS and an operation of monitoring a paging message in a PO or may select one of the operations. This method may be intended to indicate a change in particular information related to paging to a particular group of wireless devices using a WUS. Here, a PO already configured may be used instead of allocating a separate resource for a WUSO.

Figure 16:
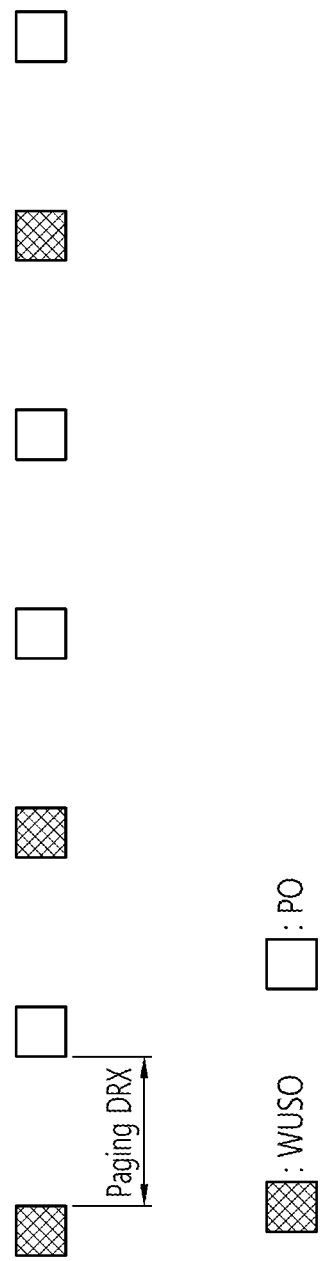
FIG. 16 illustrates a third example of the third method of the second disclosure.

FIG. 16 illustrates a third example of the third method of the second disclosure.

FIG. 16 shows a method of determining a paging window using a WUS according to the third example of the third method of the second disclosure.

When the first example, the second example, and the third example described above are used and a WUS is designed as a physical channel using DCI, the bit size of a corresponding DCI format may be set to be the same as the bit size of a DCI format for an NPDCCH transmitted in a PO used for a WUSO. This method may be intended for a wireless device to monitor both a WUS and an existing NPDCCH in the WUSO without increasing blind decoding.

II-4: Fourth of Second Disclosure

A WUSO may be set to be in a subframe equivalent to or adjacent to a subframe in which a synchronization signal is transmitted, which may be intended to increase the accuracy of time synchronization in the process of acquiring a WUSO or to reduce a delay that may occur between an operation of monitoring a WUSO and an operation of acquiring a synchronization signal. For example, a WUSO may be determined to be configured in a subframe in which a PSS or SSS is transmitted. In another example, a WUSO may be determined to be configured in a subframe adjacent to a subframe in which an NPSS or NSSS is transmitted.

In the proposed method, a WUSO may be determined to be positioned in a subframe equivalent to or adjacent to a subframe for a PSS/SSS (or NPSS/NSSS) prior to and closest to a PO corresponding to the WUSO, which may be intended to minimize a delay in time involved in acquiring a synchronization signal, WUSO monitoring, and paging monitoring.

II-5: Fifth Method of Second Disclosure

When a TDD structure is applied, the position of a WUSO may correspond to the position of a special subframe.

In this case, whether to apply (or configure) a WUSO may be determined depending on configuration information about a special subframe. Here, a wireless device may determine whether a WUSO is configured/applied through configuration information about a special subframe. For example, in the case of configuration information about a special subframe having a short DwPTS, the wireless device may determine that a base station does not transmit a WUS. In the case of configuration information about a special subframe having a long DwPTS, the wireless device may determine that a WUSO is configured.

When a special subframe is configured for a WUSO, the WUSO may be set to be configured according to a specific period. To this end, the base station may indicate information about a start position and the period to the wireless device. Such indication may be performed via a higher-layer signal, such as an SIB or an RRC signal. The information may be determined to be specific to a wireless device or a wireless device group. The wireless device may estimate the determined position of the WUSO on the basis of the information provided by the base station and the identifier of the wireless device (e.g., a UE ID). Alternatively, a special subframe used for a WUSO may include only particular special subframes. To this end, a method of indicating a subframe number or a radio frame number may be used, or a bit map may be used. Here, relevant information may be determined to be specific to a wireless device or a wireless device group.

If there are two special subframes in one radio frame and only one of the two special subframes is used for a WUSO, the position of the one subframe may be determined to be dependent on a position in which a synchronization signal is transmitted. For example, if a downlink synchronization signal needs to be acquired before the detection of a WUS, the position of the WUSO may be set to the position of the closest special subframe among the subframes following a subframe for the SSS (or NSSS), which may be intended to minimize a delay in time taken to monitor the WUS after the synchronization signal is acquired. On the contrary, if a WUS can be detected without an accurate downlink synchronization signal but downlink time synchronization needs to be accurately performed in order to monitor a downlink channel after the WUS, the position of the WUSO may be set to the position of the closest special subframe among the subframes before a subframe for the SSS (or NSSS), which may be intended to minimize a delay in time taken to acquire the downlink synchronization signal after the WUS is acquired.

When a special subframe is used for a WUSO, the wireless device may determine whether to monitor a WUS according to the coverage extension level thereof. Here, configuration information about the special subframe may be used as another condition for determining whether to perform monitoring. For example, when the wireless device determines through the RSRP thereof that the coverage extension level thereof is a specified threshold or higher, the wireless device may give up monitoring the WUSO. Here, the threshold may be changed according to the configuration of the special subframe, which may be for preparing for the case where the wireless device located in an area having high-level coverage extension has difficulty acquiring a WUS in a situation where repeated reception is restricted due to the special subframe having a limited length.

III. Third Disclosure: Indication of Paging Window or PO

This section proposes a method of using a WUS to indicate a paging window and/or a PO in which a wireless device performs NPDCCH monitoring. The wireless device monitors a WUSO assigned thereto and may accordingly identify whether there is a paging window and/or a PO that the wireless device needs to monitor. The paging window is defined as an interval in which the wireless device monitors a PO in order to read a paging message. In this case, the WUS is used to indicate a wake-up operation of the wireless device. Alternatively, the paging window may be used as an interval in which the wireless device does not monitor a PO. In this case, the WUS is used to indicate a go-to-sleep operation of the wireless device. One paging window may include one or more POs. The wireless device monitors possible POs in the paging window for an NPDCCH.

A position at which the paging window is configured may be determined to be after a specified gap from the WUSO. This gap may be provided for the wireless device to detect the WUSO and to prepare to monitor paging. Alternatively, the gap may be for flexibly scheduling the WUSO and the PO. Here, the size of the gap may be determined through a higher-layer signal, and may be determined according to the default value otherwise. Alternatively, the size of the gap may be indicated via information included in the WUS. For example, the gap may be determined to be an $n_{gap\_w\_to\_p}$ subframe as to a downlink subframe. The paging window may be determined such that the interval of the paging window is not changed even though an invalid subframe is included.

The wireless device may not expect that a PO occurs in an interval other than the paging window, which may be intended to limit an interval in which a base station can actually transmit a paging message, thereby reducing the load of blind decoding performed by the wireless device. The paging window may be set to an interval from the time the WUSO is monitored (or from the time the gap is applied after the WUSO is monitored) to the time before the next WUSO occurs. In this case, the wireless device can determine the paging window without acquiring a separate signal. Alternatively, the paging window may include an interval configured through a higher-layer parameter from the time the WUSO is monitored (or from the time the gap is applied after the WUSO is monitored). In this case, the position of a PO that the wireless device needs to monitor is restricted, thereby reducing power consumption due to blind decoding.

IV. Fourth Disclosure: Control of DRX Cycle

This section proposes a method of using a WUS to control a paging DRX cycle for a wireless device to perform NPDCCH monitoring. The wireless device monitors a WUSO assigned thereto and may accordingly determine the period of a PO in which a base station actually transmits an NPDCCH. This method may be intended to reduce the DRX cycle of some wireless devices with the paging DRX cycle for the entire cell maintained when the demand for paging from a particular wireless device or a particular group of wireless devices is greater than that from other wireless devices during a particular interval. On the contrary, this method may be intended to increase the DRX cycle of some wireless devices with the paging DRX cycle for the entire cell maintained when the demand for paging from a particular wireless device or a particular group of wireless devices is lower than that from other wireless devices during a particular interval.

For example, after the wireless device detects a WUS with the period of the PO set to $T_{PO}$, the wireless device may use a new PO period $T_{PO\_new}$. In this case, $T_{PO\_new}$ may be defined as a constant multiple of $T_{PO}$, which may be expressed by the following equation.

$$T_{PO\_new} = c * T_{PO} \qquad \text{[Equation 7]}$$

Here, c is a constant value and may be designated via a higher-layer signal and/or information represented using the WUS. Alternatively, c may be a fixed value. $T_{PO\_new}$ may be designated via a higher-layer signal and/or information represented using the WUS. Alternatively, $T_{PO\_new}$ may be a predetermined fixed value.

When the method proposed in this section is used, an interval in which $T_{PO\_new}$ is applied after the detection of the WUS may be limited to be within certain subframes after the subframe in which the WUS is detected. This interval may be set via a higher-layer parameter. Alternatively, the length of this interval may be indicated via information included in the WUS. This method may be intended for the wireless device to apply the original period $T_{PO}0$ again after a certain period and to perform a normal operation even though the wireless device fails to detect the WUS. Alternatively, the interval in which $T_{PO\_new}$ is applied may be limited to be within certain subframes after a delay of a predetermined gap from the time the WUS is detected.

Figure 17:
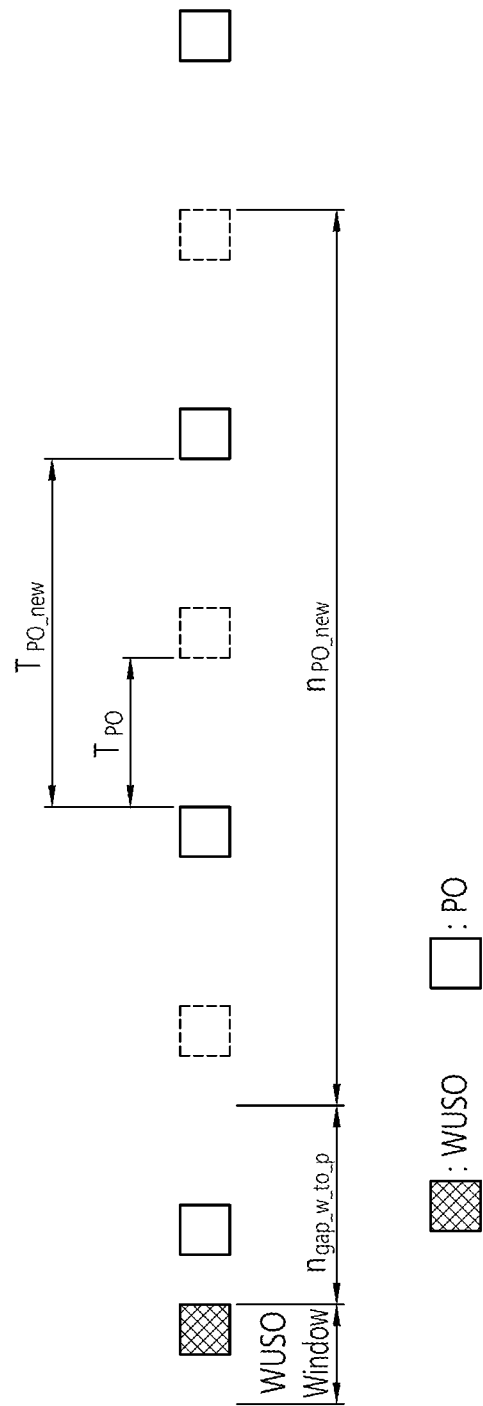
FIG. 17 illustrates a method according to a fourth disclosure.

FIG. 17 illustrates a method according to the fourth disclosure.

It is assumed that the index of a subframe where a WUS is detected is n. Referring to FIG. 17, when the size of a gap configured from the time after the WUS is detected to the time before a PO is monitored is $n_{gap\_w\_to\_p}$ and the length of a subframe interval in which $T_{PO\_new}$ is applied is $n_{PO\_new}$, the start point of a new period may be defined as $n+n_{gap\_w\_to\_p}$ and the end point thereof may be defined as $n+n_{gap\_w\_to\_p}+n_{PO\_new}$. If this interval is not defined or a wireless device fails to obtain corresponding information, the wireless device may set this interval to the time at which the next WUS is detected.

In the method proposed in this section, if the position of a WUSO is determined to be a position relative to the PO, the position of the WUSO may be determined based only on the original PO period $T_{PO}$, which may be for preventing the wireless device from missing the next WUSO even though the wireless device fails to monitor the WUS. According to another method for the same purpose, the position of the WUSO may be selected based on a greater value of $T_{PO}$ and $T_{PO\_new}$.

The method proposed in this section may be applied in order to prevent the wireless device from performing paging monitoring for a certain period. To this end, $T_{PO\_new}$ is considered to be infinite, or a base station configures $T_{PO\_new}$ to be a value greater than the interval $n_{PO\_new}$ in which $T_{PO\_new}$ is applied. Alternatively, when detecting a WUS in a WUSO corresponding thereto, the wireless device may not monitor paging during a predetermined interval. When a WUSO occurs within the interval in which paging is not monitored, the wireless device may monitor a WUS, which may be intended to reflect a change in information about paging monitoring. The interval in which paging is not monitored may be determined through a higher-layer signal. Instead, the interval in which paging is not monitored may be indicated via information included in the WUS. For example, the interval may be represented by the number of consecutive subframes. Alternatively, the interval may be represented by the number of POs. If the wireless device does not obtain corresponding information or there is no configured information, the wireless device may operate based on a predetermined fixed value.

V. Fifth Disclosure: Indication of Additional PO

This section proposes a method of using a WUS to temporarily add a PO to a wireless device. In this case, the added PO may have a method independent of an existing method of determining a cell-common PO that the wireless device has. For example, assuming that the index of a subframe for a PO determined as a cell-common PO has a period of $T_c$ with respect to $n_c$, the index of a subframe for the added PO may have a period of Tada with respect to nada. This may be intended to ensure the flexibility of POs when the demand for paging from a particular wireless device or a particular group of wireless devices temporarily increases.

After the wireless device detects a WUS, the start position of the added PO may be a subframe after a certain length of subframes from the subframe in which the WUS is detected. Here, the interval from the position of the subframe in which the WUS is detected to the position of the subframe of the additional PO may be set through a higher-layer signal. Alternatively, the interval from the position of the subframe in which the WUS is detected to the position of the subframe of the additional PO may be indicated via information included in the WUS.

When the method proposed in this section is used, an interval for monitoring the PO added after the WUS is detected may be limited to be within certain subframes after the subframe in which the WUS is detected. Here, this interval may be set via a higher-layer parameter. Alternatively, this interval may be indicated via information included in the WUS. This method may be intended for the wireless device to monitor the original PO again after a certain period even though the wireless device fails to detect the WUS. Alternatively, this method may be intended for the wireless device to autonomously suspend the added PO without receiving a separate release signal.

Figure 18:
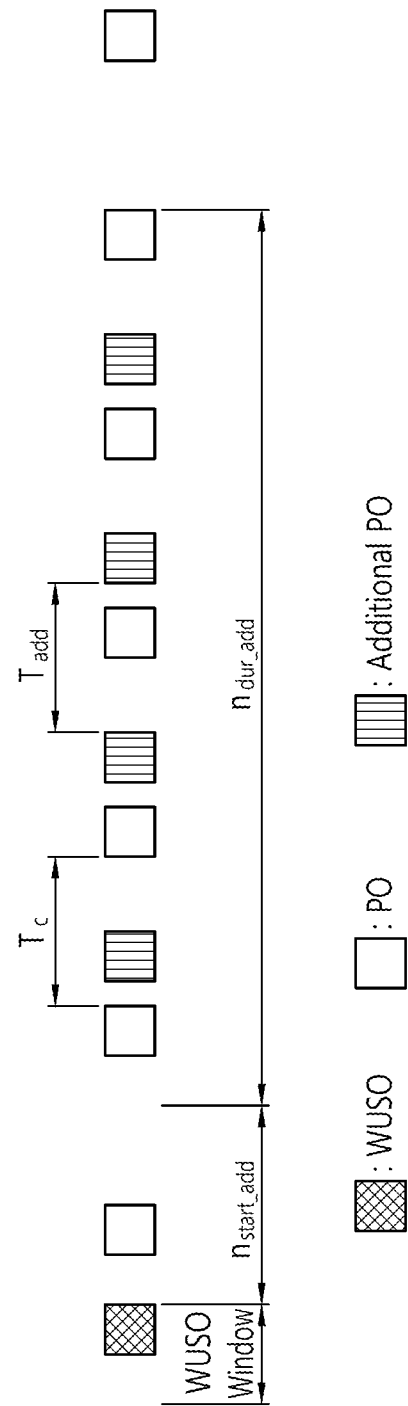
FIG. 18 illustrates a method according to a fifth disclosure.

FIG. 18 illustrates a method according to the fifth disclosure.

As illustrated in FIG. 18, when a gap for designating a start subframe of an additional PO is defined as $n_{start\_add}$ and the length of a subframe interval in which the additional PO is monitored is defined as $n_{dur\_add}$, a wireless device that has detected a WUS thereof at a position n0 can monitor the additional PO within subframes from $n0+n_{start\_add}$ to $n0+n_{start\_add}+n_{dur\_add}$.

According to the method proposed in this section, when the wireless device detects the WUS indicating the additional PO, the wireless device may monitor only the new PO without monitoring the existing PO. This may be intended to reconfigure POs while minimizing an increase in the number of times the wireless device performs blind decoding when a PO occurs at a position that is favorable for a particular wireless device or a particular group of wireless devices in terms of scheduling flexibility.

VI. Sixth Disclosure: Design of WUS

A radio resource used to transmit a generated WUS may be defined as a block that includes one or more REs. In the following description, a block used for one WUS is referred to as a wake up signal block (WUSB). Here, if the WUS has a sequence structure, the WUSB may be a form of one or more grouped sequences.

VI-1: First Method of Sixth Disclosure: WUSB Repetition Size

This section includes a method of determining a WUSB repetition size. A WUSB repetition size may be determined by one of the following methods. The following description will be made about a method of determining a WUSB repetition unit, which may also be used as a method of determine an interval in which a WUS is transmitted in a time domain.

(First embodiment) A WUSB repetition size may be determined by a higher-layer parameter configured for paging, which may be for enabling a wireless device, which has detected a WUS, to also detect paging. The WUSB repetition size may be a specific positive integer value that is mapped through the higher-layer parameter defined for paging. For example, the WUSB repetition size may have the same value as a paging repetition size. In another example, in NB-IoT, the WUSB repetition size may be determined by a function of $R_{max}$ configured for paging.

(Second embodiment) Even though a WUSB repetition size is set to be the same as a repetition size configured for paging, a maximum WUSB repetition size may be set not to exceed a certain size, which may be for reducing power consumption required for a wireless device to monitor a WUSB.

(Third embodiment) A WUSB repetition size may be indicated through a higher-layer signal configured for a WUS. For example, this information may be transmitted through a signal that can be obtained by a wireless device in the RRC-idle state, such as a SIB.

(Fourth embodiment) A WUSB repetition size may be determined by a combination of a higher-layer parameter configured for a WUS and a higher-layer parameter configured for paging, which may be for reducing overheads of information for configuring a WUSB repetition level and supporting an appropriate repetition level. One of the following two options may be used as a specific method for applying this embodiment.

(Option 1 of fourth embodiment) When a higher-layer parameter for configuring a WUSB repetition is represented by N bits, the number of repetitions expressed using the N bits may be determined by the number of repetitions used for paging. For example, it is assumed that the value of the number of repetitions corresponding to the N bits representing the higher-layer parameter for configuring the WUSB repetition is present in a table. The table may be different depending on an interval to which $R_{max}$ determining the number of repetitions of paging belongs.

(Option 2 of fourth embodiment) When a higher-layer parameter for configuring a WUSB repetition is represented by N bits, a value interpreted using the N bits may be a specific positive integer value $R_{mp}$. Here, when a higher-layer parameter value used for determining the number of repetitions of paging is $R_{max}$, a WUSB repetition value may be determined to be $R_{mn}*R_{max}$.

(Fifth embodiment) A WUS repetition level may be set differently for each carrier, because an available transmission resource may be different for each carrier or a radio channel environment may be different for each carrier. For example, a repetition level for an anchor carrier may be different from a repetition level for a non-anchor carrier. Here, a method of independently configuring a repetition level for each carrier through a higher-layer signal may be used. Alternatively, a repetition level for a non-anchor carrier may be set to a multiple of that for an anchor carrier. Here, the repetition level for the anchor carrier and the multiple may be indicated through a higher-layer signal. Alternatively, when a different $R_{max}$ value is designated for each carrier and a repetition level is determined dependently, different WUS repetition levels may be determined.

VI-2: Second Method of Sixth Start: WUSB Size

This section describes a method in which the size of a WUSB is configured by a base station. For example, when a WUS has a sequence form, the size of a WUSB may be determined by the length of a sequence used by the base station. In this case, a wireless device may estimate the length of a sequence used according to the size of a configured WUSB. A WUSB size may be determined by one of the following methods or by combination of one or more embodiments.

(First embodiment) A WUSB size may be determined by a WUSB (or paging) repetition size or a function of a higher-layer parameter for configuring a WUSB (or paging) repetition size. For example, in NB-IoT, a WUSB size may be determined by a function of $R_{max}$ configured for paging.

(Second embodiment) A WUSB size may be determined through a higher-layer parameter configured for the WUSB size. For example, this information may be transmitted through a signal that can be obtained by a wireless device in the RRC-idle state, such as a SIB.

(Third embodiment) The base station may operate WUSBs of different sizes. Here, the respective WUSBs may be transmitted through different time resources and/or frequency resources. Configuration information about each WUSB may be indicated to the wireless device via a higher-layer signal, such as a SIB. In this case, the wireless device may select a WUSB which is suitable for the wireless device and may monitor a WUSO in which a corresponding WUS is configured. This embodiment may be provided to enable the base station to support various ranges of coverage in a situation where the base station does not know the channel state of the wireless device and to reduce power consumption of the wireless device.

VI-3: Third Method of Sixth Disclosure: Amount of Information Expressed by WUS

This section describes a method in which the amount of information that can be expressed by a WUS is configured by a base station. For example, when a WUS is transmitted in the form of a sequence, the amount of information that can be expressed by the WUS may be determined by the number of sequences operated by the base station. In this case, a wireless device may estimate a monitored WUS according to the number of sequences configured by the base station. In another example, when a WUS is transmitted in the form of DCI, the amount of information that can be expressed by the WUS may be the number of bits representing meaningful information of the DCI. In this case, the wireless device may perform blind decoding according to the size of bits configured by the base station, or may perform decoding by recognizing meaningless information as a pre-agreed fixed value. The amount of information that can be expressed by the WUS may be determined by one of the following embodiments. Although the number of sequences is illustrated as an example in the following description, it will be apparent that other methods, such as the number of bits of DCI, may be generally applicable to determine the amount of information that can be expressed by the WUS.

(First embodiment) The number of sequences used for a WUS may be determined by a WUSB (or paging) repetition size or a function of a higher-layer parameter for configuring a WUSB (or paging) repetition size. For example, in NB-IoT, a WUSB size may be determined by a function of $R_{max}$ configured for paging.

(Second embodiment) The number of sequences used for a WUS may be determined through a higher-layer parameter configured for the number of sequences used for a WUS. For example, this information may be transmitted through a signal that can be obtained by a wireless device in the RRC-idle state, such as a SIB.

(Third embodiment) The number of sequences used for a WUS may be determined by the size of a group of wireless devices that monitor the same WUSO. For example, the number of sequences may be determined based on a higher-layer parameter used when determining an identifier (e.g., UE_ID) of a wireless device.

VII. Seventh Disclosure: Illustrative Examples

The content of the first to sixth disclosures of this specification may be implemented as follows. For the convenience of explanation, the following description shows embodiments of indicating whether to transmit a particular downlink channel to wireless devices in the RRC-idle state in an NB-IoT system. However, the following description may also be applied to wireless devices that are RRC-connected with other systems designed for data transmission and reception.

Content to be proposed may be used to indicate whether a wireless device needs to monitor POs at particular positions based on DCI. Hereinafter, DCI used for the foregoing purpose is referred to as new DCI for convenience. The new DCI may be configured to be detected in the same search space as an NPDCCH for paging, which means that the new DCI can be transmitted in a PO. Therefore, the wireless device may perform blind decoding of both an NPDCCH for the new DCI and the NPDCCH for paging in a search space to monitor in accordance with the DRX of the wireless device. Here, the new DCI may be defined to have a format having the same size as that of the NPDCCH for paging. That is, the number of bits expressed by the new DCI is equal to the number of bits expressed by DCI for paging. This may be for reducing the number of times the wireless device needs to perform blind decoding in order to detect the two pieces of DCI. The new DCI may be masked with a CRC having an independent RNTI to be distinguished from the DCI for paging, which may be for distinguishing the two pieces of DCI having the same format size in the same search space.

The new DCI may include information about a particular wireless device or a particular group of wireless devices. This information may be used to identify a wireless device that needs to receive the new DCI among the wireless devices that monitor a corresponding PO. When the wireless device identifies an identifier thereof or an identifier of a group to which the wireless device belongs through the information in the new DCI, the wireless device may monitor a PO that occurs for a certain period through the new DCI information. When the wireless device fails to identify the identifier thereof or the identifier of the group to which the wireless device belongs, the wireless device may continuously monitor a next PO.

The new DCI may include information specifying whether to monitor one or more POs. At the position of a PO determined to perform monitoring via the new DCI, the wireless device may need to perform a wake-up operation. In a PO determined not to perform monitoring through the new DCI, the wireless device may need to perform a go-to-sleep operation. Here, the information may be expressed in a bitmap and may indicate whether the wireless device needs to monitor N consecutive POs after the PO where the new DCI is detected.

Specifically, the new DCI may be transmitted according to one of the following options.

(Option 1) The new DCI is transmitted at the time when the base station that the new DCI is necessary among the POs for transmission.

(Option 2) The new DCI is transmitted according to a period from a predetermined start position among the POs for transmission.

(Option 3) The new DCI is transmitted in an occasion indicated by the bitmap among the POs for transmission.

Option 1 has high scheduling flexibility in that the new DCI can be transmitted only when the base station determines that the new DCI is necessary. In option 2 and option 3, the base station may determine a position and may indicate the position to the wireless device through a higher-layer signal, such as a SIB or an RRC signal. In this case, signaling overhead increases. Here, the base station may not transmit the new DCI even in a PO determined for transmitting the new DCI, because the new DCI is not needed at the position or the PO needs to be used for transmitting an NPDCCH for paging. Further, regarding an interval in which the wireless device does not monitor a PO for a long time, such as eDRX, the wireless device may not monitor the new DCI even though the interval is a position where the new DCI can be transmitted as specified in option 2 and option 3, which may be for reducing unnecessary power consumption of the wireless device.

It may be indicated whether the new DCI is used through a higher-layer signal, such as a SIB or an RRC signal.

Even when the wireless device already recognizes whether to monitor a PO through first new DCI and monitors the PO indicated by the first new DCI, the wireless device may continue to monitor whether there is second new DCI. Here, a PO for monitoring the second new DCI may be determined to be only the PO indicated by the first new DCI. If the wireless device detects the second new DCI for an identifier thereof or a group to which the wireless device belongs, the wireless device may discard information about the previously received first new DCI and may determine a PO to monitor according to the second new DCI.

If information about new DCI is not received or a PO interval specified by new DCI is terminated, the wireless device may monitor a PO in all possible intervals. That is, the position of an existing PO to monitor is applied in the same manner by the existing rules. (Here, the existing rule means a method by which a wireless device incapable of distinguishing new DCI determines a PO to monitor.)

VIII. Eighth Disclosure

As described above, a WUS may be used for a base station to notify a particular wireless device or a group of wireless devices that a PDCCH (or MPDCCH or NPDCCH) is transmitted.

In another example, a WUS may be used to notify a particular wireless device or a group of wireless devices that a PDCCH (or MPDCCH, or NPDCCH) is not transmitted.

Also, a WUS may be used to indicate the presence or absence of a PDSCH (or NPDSCH) expected by a wireless device. For example, in PDSCH (or NPDSCH) transmission that does not require separate downlink (DL) grant information, a WUS may be used to limit a BD for the wireless device and to indicate whether a PDSCH is transmitted.

Further, a WUS may be used for a wireless device to identify whether specific information is updated. Specifically, a transmission channel for transmitting system information, such as a PBCH (or NPBCH) or SIB1 (or SIB1-BR or SIB1-NB), may be used to indicate whether the information is updated.

In addition, a WUS may be used for a wireless device to skip monitoring a particular NPDCCH and to perform downlink reception or uplink transmission according to preset information. In this case, configuration information to be used may be designated in advance through a higher-layer signal, such as a SIB or an RRC signal.

Further, a WUS may be used to reuse previously used information as it is. In this case, the WUS may be used when a wireless device applies a DL grant of the same type when receiving consecutive downlink channels, and the wireless device detecting the WUS may skip monitoring an associated NPDCCH. The WUS may be used when the wireless device applies a UL grant of the same type when transmitting a consecutive uplink channels, and the wireless device detecting the WUS may skip monitoring an associated NPDCCH.

In this section, for the convenience of explanation, a WUS is described as being used to indicate whether to monitor an NPDCCH. However, it is apparent that a WUS may generally be applicable for other uses.

VIII-1. First Method of Eighth Disclosure: WUS Design Method Based on Physical Signal This section proposes available design methods considering that a WUS is generated in the form of a sequence.

A WUS may be generated in a form based on a Zadoff-Chu (ZC) sequence and a bit sequence. Here, the WUS may be represented by the following equation.

$$d(n) = b_q(n) \times e^{-j2\pi\Theta_r n} \times e^{-[j\pi u_s n'(n'+1)]/N_{ZC}} \quad \text{where} \quad n = 0, 1, \ldots, N-1$$

$$n' = n \bmod N_{ZC} \qquad \text{[Equation 8]}$$

Here, n is a value representing the index of the sequence and has a value ranging from 0 to N−1 when the length of the sequence is N. The length of the sequence, N, may be determined by a unit of an RE group representing one WUS. For example, N may be determined according to the size of a used OFDM symbol. If the WUS sequence is represented by $n_{sym}$ symbols and one symbol includes $n_{subcarrier}$ subcarriers, the length of the WUS sequence, N, may be represented as below.

$$N = n_{subcarrier} \times n_{sym} \qquad \text{[Equation 9]}$$

For example, in NB-IoT, $n_{subcarrier}$ may be 12.

In Equation 8, the size of $N_{ZC}$ may be determined to be a prime number that is close to N. If N is determined by the number of OFDM symbols used for one WUS sequence, $N_{ZC}$ may also be defined by a function determined by the number of the used OFDM symbols. For example, in NB-IoT, when N is determined by Equation 9 and $n_{subcarrier}$ is 12, $N_{ZC}$ determined according to the number of symbols forming one WUS may be selected from among the values listed in the following table.

TABLE 2

| $n_{sym}$ | N | $N_{ZC}$ |
|---|---|---|
| 1 | 12 | 11, 13 |
| 2 | 24 | 23 |
| 3 | 36 | 37 |
| 4 | 48 | 47 |
| 5 | 60 | 59, 61 |
| 6 | 72 | 71, 73 |
| 7 | 84 | 83 |
| 8 | 96 | 97 |
| 9 | 108 | 107, 109 |
| 10 | 120 | 113, 127 |
| 11 | 132 | 131 |
| 12 | 144 | 139, 149 |
| 13 | 156 | 157 |
| 14 | 168 | 167 |

For example, when $n_{sym}=1$, $N_{ZC}=13$ may be used instead of $N_{ZC}=11$ in order to prevent deterioration in the performance of an NPSS. Further, in NB-IoT, when a WUS reuses an NSSS sequence, $n_{sym}=11$, N=132, and $N_{ZC}=131$. In NB-IoT, since a different number of symbols can be used in each operation mode, $N_{ZC}$ may be determined according to the operation mode. In Equation 8, $b_q(n)$, $\Theta_r$, and us may be used to distinguish information. In this case, expressed information may be an ID of a wireless device (or a group ID of a wireless device), a cell ID, an NPDCCH interval to be monitored, time/frequency resource allocation information, a new data indication (NDI), a system information update indication, or information indicating wakeup or sleep. $b_q(n)$, $\Theta_r$, and us may be used independently or in a combination of one or more methods. When one or more methods are used in combination, the respective parameters may represent separate pieces of information or may be used to partially represent one piece of information. If the expressed information includes an ID of a wireless device (or a group ID of wireless devices), at least one sequence may be used to wake up all wireless devices that monitor that the position of the sequence (or to make all the wireless devices go to sleep). This sequence may be for waking up all wireless devices as in updating system information or for waking up a group of two or more wireless devices (or making the group of two or more wireless devices go to sleep). A separate sequence for indicating updating of system information may be used. When it is determined to update system information, a wireless device capable of reading a WUS can obtain updated information only through a WUS without additionally monitoring a paging message, thereby decreasing power consumption and reducing a delay.

$b_q(n)$ may be in the form of a sequence having a value of 1 or −1. The sequence used herein may be set to a portion selected from among the rows of a Hadamard matrix. Here, the size of the used Hadamard matrix may be set to be the same as N, which is the length of the WUS sequence. For example, if the WUS is designed to follow the form of an NSSS and to identify four pieces of information through $b_q(n)$, $b_0(n)$, $b_1(n)$, $b_2(n)$, and $b_3(n)$ may be respectively set to 1st, 32nd, 64th, and 128th rows selected from a 128×128 Hadamard matrix. If the WUS is designed to follow the form of an NSSS and to identify eight pieces of information through $b_q(n)$, 1st, 16th, 32nd, 48th, 64th, 80th, 112th, and 128th rows of the 128×128 Hadamard matrix may be used. Alternatively, a pseudo-random sequence may be used for $b_q(n)$. For example, the used pseudo-random sequence may be a length-31 Gold sequence defined by Equation 11 in LTE standard TS 36.211. In this case, identified information is determined by the initialization of $x_2(n)$ and may be represented by the following equation.

$$c_{init} = \Sigma_{i=0}^{30} x_2(i) \cdot 2^i \qquad \text{[Equation 10]}$$

For example, if the WUS is designed to identify eight pieces of information, $C_{init}$ can have eight different integer values.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \qquad \text{[Equation 11]}$$

where $N_C=1600$, with $x_1(0)=1$, $x_2(n)=0$ for $n=1, 2, \ldots, 30$

The length of $b_q(n)$ may be set to have the same value as N, which is the length of the WUS sequence. Here, N may be set to include all REs in a symbol used for the WUS without considering the number of REs that are punctured or overlap for transmission of a reference signal (RS). Alternatively, the length of $b_q(n)$ may be determined based on the number of REs actually used for the WUS. For example, in NB-IoT, if the total number of REs used for the WUS is 100, the length of a PN sequence may also be set to satisfy 100. As in this example, when the length of a WUS sequence is determined to be the number of REs used for the WUS, if the number of REs available for the WUS varies depending on the operation mode, the length of a PN-sequence may be determined according to the operation mode.

$\Theta_r$ may be represented by the following equation. In the following equation, R denotes the size of information represented through $\Theta_r$, and r denotes the index of the information. For example, when four pieces of information are identified through $\Theta_r$, R is 4 and r may be set to one selected from among 0, 1, 2, and 3.

$$\theta_r = r/R \quad \text{[Equation 12]}$$

$u_s$ is a value that determines the root sequence index of the ZC sequence and may be represented by an integer. If $N_{ZC}$ is determined in Equation 8, a total of $N_{ZC}$ integers can be used as $u_s$. In this case, when there are a total of S pieces of information to be identified by the WUS, S integers among the $N_{ZC}$ integers may be selected and used for the WUS. Here, the S selected root sequence indexes may be selected in the order of values to minimize the PAPR (or CM) of the ZC sequence. Also, the S root sequence indexes may be selected to have no impact or a minimum impact on the performance of an existing sequence for a different use. For example, when $n_{sym}=1$ and $N_{ZC}=11$, $u_s$ selected for the WUS may be set to a value other than 5, which may be for preventing deterioration in cell selection/reselection performance and WUS performance by distinguishing from an NPSS. For example, when one root sequence index is selected for the WUS, $u_s$ may be set to 6.

A method of mapping the WUS to a resource may be based on a frequency-first-time-second manner. Here, RE positions used for any reference signal may be punctured. For example, in NB-IoT, REs used for a CRS and am NRS may be configured to puncture the WUS. Accordingly, when the WUS is set to use an NB-IoT downlink subframe, wireless devices may expect that an NRS is transmitted in the subframe, and backward compatibility may be secured for wireless devices incapable of recognizing a structure supporting a WUS.

In a structure in which a WUS is mapped to a resource, when one WUS or repeated WUSs use consecutive symbols, a cover code in a time unit of one or more symbols may be applied. The used time unit may be one symbol, one slot, or one subframe, or may be the number of symbols required to map one WUS to a resource. The cover code may be for distinguishing a designed WUS from a signal for another use, which has a structure similar or identical to that of the designed WUS. For example, when a WUS having a structure similar to that of an NPSS is used in NB-IoT, a cover code that is orthogonal to or has a low correlation property with a cover code in a symbol unit used for the NPSS may be used for the WUS. Alternatively, a cover code in a time unit may be used for representing information. For example, a plurality of cover codes that is orthogonal to each other or satisfies a low correlation property may be used for representing information transmitted through the WUS.

If the wake-up operation and the go-to-sleep operation are distinguished by a sequence type, the wireless device may be set to monitor an associated NPDCCH only when a wake-up sequence is transmitted. Here, when a sequence corresponding to the go-to-sleep operation is transmitted, a signal may be used to skip one or more NPDCCH search spaces. If a signal is for skipping one NPDCCH, the signal may not be transmitted. In this case, the wireless device may determine a subsequent operation depending on whether a signal is detected and the type of an applied sequence if the signal is detected. This operation may be illustrated as follows.

When a wake-up sequence is transmitted, the wireless device performs an operation of monitoring one NPDCCH (or NPDSCH) indicated by a detected signal.

When no signal is transmitted, the wireless device skips monitoring one NPDCCH (or NPDSCH) associated with an occasion of a signal that the wireless device attempts to detect.

When a go-to-sleep sequence is transmitted, the wireless device skips monitoring a plurality of NPDCCHs (or NPDSCHs) indicated by a detected signal or monitoring an NPDCCH (or NPDSCH) for a certain period of time.

VIII-2. Second Method of Eighth Disclosure: Physical Channel-Based WUS Design Method This section proposes methods of generating a WUS in the form of a physical channel. When a WUS is generated in the form of a physical channel, the form may be a channel including DCI, such as a PDCCH (or MPDCCH or NPDCCH). Here, information included in the DCI includes an ID of a wireless device (or a group ID of wireless devices), a cell ID, an NPDCCH interval to be monitored, time/frequency resource allocation information, a new data indication (NDI), a system information update indication, or information indicating wakeup or sleep. The illustrated pieces of information may be represented by a combination of one or more pieces of information in DCI for one WUS.

When information indicating system information update is included, DCI may employ a one-bit flag to indicate whether the WUS is for a wake-up (or go-to-sleep) use or is for indicating system information update. For example, information of 1 may indicate a wake-up operation (or go-to-sleep operation), and information of 0 may indicate an operation of updating system information. In this case, the information included in the DCI may be different according to the information of the flag. For example, when a flag indicating system information update is included, the remaining bits of the DCI may be used to indicate information related to system information update.

When information indicating wake-up or sleep is included, DCI may employ one bit to represent the information. For example, information of 1 may indicate a wake-up operation, and information of 0 may indicate a go-to-sleep operation. If this bit serves the same as a flag, information represented by the remaining bits may vary depending on the bit represented by the flag. For example, the number of bits for determining a wireless device group or an NPDCCH monitoring interval may be defined differently according to a corresponding flag. Alternatively, CRC masking may be used to represent the information indicating wake-up or sleep. For example, two RNTIs may be set to indicate wake-up and sleep, respectively. Here, DCI representing wake-up information and DCI representing go-to-sleep information may be set to have the same size, and bits of the respective pieces of DCI may indicate different pieces of information. If there is a flag indicating system information update, a flag designating wake-up or go-to-sleep may be set to be selectively identified after reading the flag indicating system information update. This is because, if the WUS is used to indicate system information update, a wireless device detecting the WUS does not need to select a wake-up or go-to-sleep operation and the content of the DCI also varies.

When information about an ID of a wireless device (or a group ID of wireless devices) is included, the number of DCI bits may be the same as the number of IDs of wireless devices (or group IDs of wireless devices) to be identified. In this case, for example, information of bit 1 may be set to perform a wake-up (go-to-sleep) operation, and information of 0 may be set not to perform a wake-up (go-to-sleep) operation. For example, when wireless devices monitoring a WUS are divided into L groups and it is indicated whether to perform a wake-up (go-to-sleep) operation, the total number of bits for indicating the respective wireless device groups is L. Here, there may be a plurality of groups or no group of wireless devices that are assigned information of 1 to perform the operation among the L groups. The number of divided groups, which is L, may be designated through a higher-layer signal, such as a SIB or an RRC signal. Here, if the maximum value of L is $L_{max}$, L indicated through the higher-layer signal may range from 1 to $L_{max}$. If L is smaller than $L_{max}$, $L_{max}$–L bits may be used for other purposes or may be expressed as a fixed value. If a flag designating wake-up or go-to-sleep is used, $L_{max}$ and/or L may vary depending on information represented by the flag.

When information included in DCI specifies an NPDCCH monitoring interval, the information may be defined as the time in which a wake-up (or go-to-sleep) command is applied. In this case, the size of the interval to be monitored is a pre-designated value and may be set so that each combination represented by bits used for the corresponding purpose in the DCI indicates a particular interval. When M bits in the DCI are used to represent the information, a total of $2^M$ monitoring intervals may be expressed. Here, M may be designated through a higher-layer signal, such as a SIB or an RRC signal. Here, if the maximum value of L is $M_{max}$, M indicated through the higher-layer signal may range from 1 to $M_{max}$. If M is smaller than $L_{max}$, $M_{max}$–M bits may be used for other purposes or may be expressed as a fixed value. If a flag designating wake-up or go-to-sleep is used, $M_{max}$ and/or M may vary depending on information represented by the flag. Further, information represented by a combination of used bits and the size of an NPDCCH monitoring interval corresponding to this information may vary depending on the information represented by the flag.

When information included in DCI is used to adjust a DRX cycle, the information may be for performing dynamic DRX control for each wireless device or each group of wireless devices. If P bits are used to adjust the DRX cycle, $2^P$ operations for the DRX cycle are possible. For example, Table 3 below shows an example of determining a constant used to adjust the DRX cycle when two bits are used to adjust the DRX cycle. In the following table, $c_{DRX}$ is a constant for adjusting the DRX cycle. If a DRX value obtained through a higher-layer parameter is $T_{DRX}$, a newly applied DRX value, which is $T_{DRX\_new}$, may be determined by $T_{DRX\_new} = c_{DRX} * T_{DRX}$.

TABLE 3

| Bit pattern | $c_{DRX}$ |
| --- | --- |
| 00 | 1 |
| 01 | 2 |

TABLE 3-continued

| Bit pattern | $c_{DRX}$ |
| --- | --- |
| 10 | 4 |
| 11 | 8 |

When a WUS using DCI is used in NB-IoT, an N-bit payload may be added and encoded in addition to DCI bits. For example, a CRC may be used as the added payload. Specifically, in NB-IoT, an eight-bit CRC may be used, which may be for reducing the number of bits required to configure a WUS in order to power consumption for the WUS compared to an NPDCCH the presence of which is indicated by the WUS. In this case, CRC masking may use an RNTI in order to indicate that the DCI is for the WUS. Alternatively, CRC masking may be determined based on any bit pattern that is associated with a cell ID or is assigned by a base station in order to identify a cell in which the WUS is transmitted. In another example, the added load may be an RNTI or bit information (e.g., a value calculated based on a cell ID or any bit pattern assigned by the base station) used for identifying a cell. This may be for transmitting information to a wireless device or a wireless device group that requires the WUS, instead of preventing an increase in overall overhead due to the use of a CRC having an unnecessary length to in a case where the length of the DCI is short. When a WUS is generated in the form of a physical channel, the size of DCI of the WUS may be set to be the same as that of an NPDCCH the presence of which is indicated by the WUS. Here, the NPDCCH and the physical channel for the WUS may be distinguished through an RNTI. In addition, an occasion interval in which the WUS is monitored may be set to share the same position with the NPDCCH the presence of which is indicated by the WUS. When this method is used, (1) it is possible to reuse an existing search space without adding a separate search space for the WUS, (2) it is possible to introduce a new physical channel without an increase in blind decoding (BD), and (3) it is possible to induce an operation of monitoring a next search space even though a wireless device misses the WUS. For example, when this method is used to designate a go-to-sleep operation for a particular wireless device or a particular wireless device group, an index of the wireless device group and an interval in which the go-to-sleep operation is performed may be specified in the DCI, which may be used for supporting a dynamic DRX configuration. For example, the DCI of the WUS may indicate only a search space that the wireless device needs to monitor or only a search space that the wireless device does not need to monitor. Accordingly, it is possible to reduce power consumption compared to a conventional method where a wireless device needs to monitor all search spaces. The DCI of the WUS may also indicate a DRX change. When the DRX cycle is increased through the DCI of the WUS, power consumption may be reduced. VIII-3. Third method of eighth disclosure: Two-step WUS This section illustrates a method of supporting two-step wake-up (or go-to-sleep) by combining a physical signal and a physical channel.

In a two-step wake-up (or go-to-sleep) procedure, a physical channel may be used to indicate whether there is information related to wake-up (or go-to-sleep). When a wireless device detects a physical signal corresponding thereto, the wireless device may subsequently monitor a physical channel associated with a WUS. Here, the physical signal may use the method and the content of the information described in the first method of the eighth disclosure. Here, information transmitted through the physical signal may be minimized in order to reduce power consumption or a delay that occurs in the process of monitoring the physical signal and in order to improve accuracy. Specifically, as the information, only one-bit indication information may be used to indicate whether the physical channel is transmitted. In addition, the information represented by the physical signal may include information for distinguishing wake-up and go-to-sleep operations. Here, when one or more sequences are used for the physical signal, each sequence may be used to separately indicate a wireless group or a cell ID.

In a two-step wake-up (or go-to-sleep) procedure, a physical channel may be used to indicate detailed information related to wake-up (or go-to-sleep). For example, the physical channel may be generated by the methods mentioned in the second method of the eighth disclosure.

Alternatively, a two-step wake-up (or go-to-sleep) structure may include a combination of two physical signals. For example, a first physical signal may be used to provide downlink time synchronization, and a second physical signal may be used to transmit information. Specifically, the first physical signal may be a modification of a PSS (or NPSS), and the second physical signal may be a modification of an SSS (or NSSS).

The first physical signal may be set to be always transmitted without providing information, which may be for always supporting a downlink synchronization operation even though no wake-up operation is actually indicated.

Alternatively, the first physical signal may provide wake-up or go-to-sleep information. In the presence of the signal, wake-up is indicated, and go-to-sleep is indicated using a DTX method. Alternatively, wake-up and go-to-sleep may be distinguished using different sequence configuration methods.

The first physical signal may be represented by a sequence distinguished by a cell ID, which may be for preventing the occurrence of malfunction due to a physical signal transmitted from an adjacent cell.

The information provided by the second physical signal may be information about a cell ID, a wireless device (or group) ID, and/or a designated NPDCCH occasion interval. Information about an NPDCCH monitoring interval may be information about the position, number, or period of a configured NPDCCH.

The two physical signals included in the two-step wake-up (or go-to-sleep) structure may be separately enabled/disabled. For example, it is indicated whether the physical signals operate via a one-bit indication through a higher-layer signal, such as a SIB or an RRC signal. A UE may determine a method of achieving downlink time synchronization and the type and amount of information transmitted through a physical signal through information of the physical signal received from a base station.

VIII-4. Fourth Method of Eighth Disclosure: Acquisition of Subframe Index

When a physical signal for obtaining downlink time synchronization is used, if a time drift of 1 ms or longer occurs, a subframe index estimated by a UE may be different from an actual subframe index. In order to prevent this problem, subframe index information or information about the start and end positions of the physical signal may be provided using the pattern of a cover code. Here, the cover code may be applied in repetitions of the physical signal. For example, when a physical signal in subframes is applied, the cover code may be applied in subframe levels, which may be for reducing complexity in detecting the physical signal and for maintaining sequence characteristics.

The applied cover code may be set to be initialized from the start subframe of the physical signal. Alternatively, the cover code may be set to occur using a random number occurring from a subframe index.

In the foregoing description, although the methods are described according to a series of steps or blocks, the present disclosure is limited to the order of these steps. Some steps may be performed in a different order as described above or simultaneously with other steps. Further, it would be understood by those skilled in the art that the steps illustrated in the flowcharts are not exclusive and may include other steps, or one or more steps in the flowcharts may be eliminated without affecting the scope of the present invention.

The aforementioned embodiments of the present invention can be implemented through various means. For example, the embodiments of the present invention can be implemented in hardware, firmware, software, and combination thereof, which will be described in detail with reference to a drawing.

Figure 19:
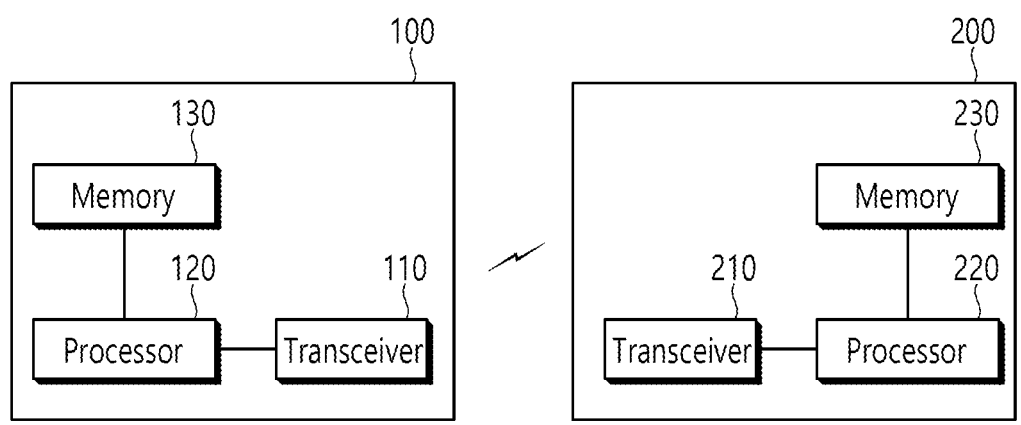
FIG. 19 is a block diagram illustrating a wireless device and a base station to implement the disclosures of the present specification.

FIG. 19 is a block diagram illustrating a wireless device and a base station to implement the disclosures of the present specification.

Referring to FIG. 19, the wireless device 100 and the base station may implement the disclosures of the present specification.

The wireless device 100 includes a processor 101, a memory 102, and a transceiver 103. Likewise, the base station 200 includes a processor 201, a memory 202, and a transceiver 203. The processors 101 and 201, the memories 102 and 202, and the transceivers 103 and 203 may each be configured as a separate chip, or at least two blocks/functions may be configured as a single chip.

The transceivers 103 and 203 include a transmitter and a receiver. When a particular operation is performed, only one of the transmitter and the receiver may operate, or both the transmitter and the receiver may operate. The transceivers 103 and 203 may include one or more antennas to transmit and/or receive a radio signal. Further, the transceivers 103 and 203 may include an amplifier to amplify a reception signal and/or a transmission signal and a band pass filter for transmission on a particular frequency band.

The processors 101 and 201 may implement the functions, processes, and/or methods proposed in the present specification. The processors 101 and 201 may include an encoder and a decoder. For example, the processors 101 and 201 may operate according to the foregoing description. The processors 101 and 201 include an application-specific integrated circuit (ASIC), a separate chipset, a logic circuit, a data processor, and/or a converter to convert a baseband signal and a radio signal from one to the other.

The memories 102 and 202 may include a read-only memory (ROM), a random access memory (RAM), a flash memory, a memory card, a storage medium, and/or other storage devices.

Figure 20:
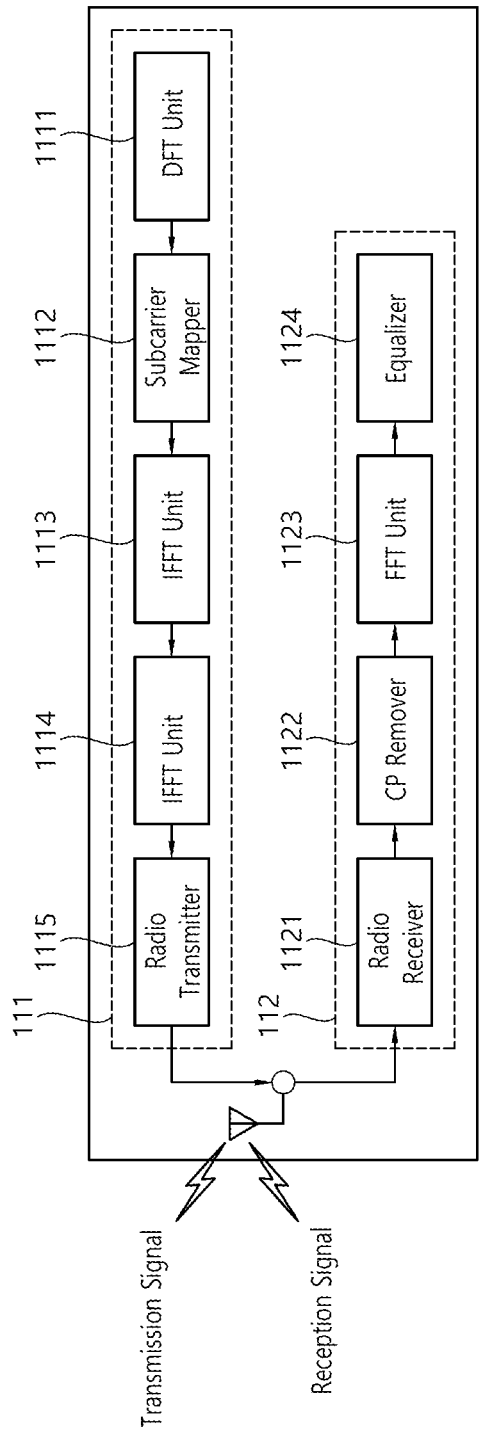
FIG. 20 is a block diagram specifically illustrating a transceiver of the wireless device illustrated in FIG. 19.

FIG. 20 is a block diagram specifically illustrating the transceiver of the wireless device illustrated in FIG. 19.

Referring to FIG. 20, the transceiver 110 includes a transmitter 111 and a receiver 112. The transmitter 111 includes a discrete Fourier transform (DFT) unit 1111, a subcarrier mapper 1112, an IFFT unit 1113, a CP inserter 1144, a radio transmitter 1115. The transmitter 111 may further include a modulator. Also, for example, the transmitter 111 may further include a scramble unit (not shown), a modulation mapper (not shown), a layer mapper (not shown), and a layer permutator (not shown), and these elements may be positioned before the DFT unit 1111. That is, in order to prevent an increase in the peak-to-average power ratio (PAPR), the transmitter 111 allows information to pass through the DFT unit 1111 before mapping a signal to a subcarrier. After performing subcarrier mapping of a signal, which is spread (or precoded, in the same sense) by the DFT unit 1111, through the subcarrier mapper 1112, the signal passes through the inverse fast Fourier transform (IFFT) unit 1113 into a signal on a time axis.

The DFT unit 1111 performs DFT on inputted symbols, thereby outputting complex-valued symbols. For example, when Ntx symbols are inputted (where Ntx is a natural number), a DFT size is equal to Ntx. The DFT unit 1111 may also be referred to as a transform precoder. The subcarrier mapper 1112 maps the complex-valued symbols to each subcarrier in the frequency domain. The complex-valued symbols may be mapped to resource elements corresponding to a resource block being assigned for data transmission. The subcarrier mapper 1112 may also be referred to as a resource element mapper. The IFFT unit 1113 performs IFFT on the inputted symbols, thereby outputting a baseband signal for data, which corresponds to a time-domain signal. The CP inserter 1114 duplicates an end part of the baseband signal for the data and inserts the duplicated part to a front part of the baseband signal for the data. By performing CP insertion, inter-symbol interference (ISI) and inter-carrier interference (ICI) may be prevented, thereby allowing orthogonality to be maintained even in a multi-path channel.

The receiver 112 includes a radio receiver 1121, a CP remover 1122, an FFT unit 1123, and an equalizer 1124. The radio receiver 1121, the CP remover 1122, and the FFT unit 1123 of the receiver 112 respectively perform the inverse functions of the radio transmitter 1115, the CP inserter 1114, and the IFFT unit 1113 of the transmitter 111. The receiver 112 may further include a demodulator.

What is claimed is:

1. A method performed by a user equipment (UE) configured to operate in a wireless communication system, the method comprising:
   monitoring a wake up signal (WUS);
   monitoring a physical downlink control channel (PDCCH) related to a reception of a paging message based on detecting the WUS; and
   receiving the paging message based on detecting the PDCCH,
   wherein a sequence of the WUS is generated based on i) an interval in which the PDCCH is monitored, and ii) a cell identifier, and
   wherein, based on there being at least one reference element (RE) where cell-specific reference signals (CRSs) or narrowband reference signals (NRSs) are transmitted in a subframe, the WUS is mapped to one or more REs excluding the at least one RE in the subframe.

2. The method of claim 1, wherein the paging message exists on a same carrier as the WUS.

3. The method of claim 1, wherein the WUS is received within a duration which includes a plurality of subframes.

4. The method of claim 3, further comprising receiving information for the duration which includes the plurality of subframes.

5. The method of claim 3, further comprising:
   receiving information related to a repetition level over the plurality of subframes,
   wherein the information related to the repetition level is received per carrier.

6. The method of claim 3, wherein the duration is determined based on the interval in which the PDCCH is monitored and an offset.

7. The method of claim 1, further comprising: determining a start position of the WUS based on the interval in which the PDCCH is monitored and an offset.

8. The method of claim 1, wherein the interval in which the PDCCH is monitored comprises a paging occasion (PO).

9. The method of claim 8, wherein the WUS includes time information of the PO.

10. The method of claim 9, wherein the WUS is generated based on the time information of the PO.

11. The method of claim 1, wherein the sequence is initialized at a start subframe including at least one slot.

12. The method of claim 1, wherein the WUS in an invalid subframe is postponed to a next valid subframe.

13. A user equipment (UE) configured to operate in a wireless communication system, the UE comprising:
    a transceiver;
    at least one processor; and
    at least one computer memory operably connectable to the at least one processor and storing instructions that, based on being executed by the at least one processor, perform operations comprising:
    monitoring a wake up signal (WUS);
    monitoring a physical downlink control channel (PDCCH) related to a reception of a paging message based on detecting the WUS; and
    receiving the paging message based on detecting the PDCCH,
    wherein a sequence of the WUS is generated based on i) an interval in which the PDCCH is monitored, and ii) a cell identifier, and
    wherein, based on there being at least one reference element (RE) where cell-specific reference signals (CRSs) or narrowband reference signals (NRSs) are transmitted in a subframe, the WUS is mapped to one or more REs excluding the at least one RE in the subframe.

14. The UE of claim 13, wherein the paging message exists on a same carrier as the WUS.

15. The UE of claim 13, wherein the WUS is received within a duration which includes a plurality of subframes, and
    wherein the duration is determined based on the interval in which the PDCCH is monitored and an offset.

16. The UE of claim 13, wherein the interval in which the PDCCH is monitored comprises a paging occasion (PO).

17. The UE of claim 16, wherein the WUS includes time information of the PO.

18. The UE of claim 17, wherein the WUS is generated based on time information of the PO.

19. The UE of claim 13, wherein the sequence is initialized at a start subframe including at least one slot.

20. A non-transitory computer readable medium (CRM) having stored thereon a program code implementing instructions that, based on being executed by at least one processor of a user equipment (UE), perform operations comprising:
    monitoring a wake up signal (WUS);
    monitoring a physical downlink control channel (PDCCH) related to a reception of a paging message based on detecting the WUS; and receiving the paging message based on detecting the PDCCH, wherein a sequence of the WUS is generated based on i) an interval in which the PDCCH is monitored, and ii) a cell identifier, and wherein, based on there being at least one reference element (RE) where cell-specific reference signals (CRSs) or narrowband reference signals (NRSs) are transmitted in a subframe, the WUS is mapped to one or more REs excluding the at least one RE in the subframe.

* * * * *